US010148843B2

United States Patent
Ikeda et al.

(10) Patent No.: US 10,148,843 B2
(45) Date of Patent: Dec. 4, 2018

(54) COMMUNICATION APPARATUS, CONTROL METHOD THEREOF, STORAGE MEDIUM, AND COMMUNICATION SYSTEM

(71) Applicant: CANON KABUSHIKI KAISHA, Tokyo (JP)

(72) Inventors: Kaori Ikeda, Kawasaki (JP); Eiko Hirose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/493,797

(22) Filed: Apr. 21, 2017

(65) Prior Publication Data

US 2017/0318182 A1    Nov. 2, 2017

(30) Foreign Application Priority Data

Apr. 28, 2016 (JP) ................................. 2016-091652

(51) Int. Cl.
*H04N 1/21* (2006.01)
*H04N 5/232* (2006.01)
*H04N 1/00* (2006.01)

(52) U.S. Cl.
CPC ....... *H04N 1/2112* (2013.01); *H04N 1/00103* (2013.01); *H04N 1/00307* (2013.01); *H04N 5/232* (2013.01); *H04N 5/23293* (2013.01); *H04N 2201/0055* (2013.01); *H04N 2201/0075* (2013.01); *H04N 2201/218* (2013.01)

(58) Field of Classification Search
CPC ............. H04N 1/2112; H04N 1/00103; H04N 2201/218
See application file for complete search history.

(56) References Cited

U.S. PATENT DOCUMENTS

| 5,357,281 A | 10/1994 | Ikeda et al. | |
|---|---|---|---|
| 2003/0043272 A1* | 3/2003 | Nagao ................ | H04N 1/00204 348/207.1 |
| 2004/0141084 A1* | 7/2004 | Kurakata ........... | H04N 1/00347 348/333.01 |

FOREIGN PATENT DOCUMENTS

JP    2008-005433    1/2008

* cited by examiner

*Primary Examiner* — Ahmed A Berhan
(74) *Attorney, Agent, or Firm* — Fitzpatrick, Cella, Harper & Scinto

(57) ABSTRACT

A communication apparatus comprises: a communication unit configured to communicate with a recording apparatus having storage medium and capable of accepting an operation on the content data stored in the storage medium via communication; a registration unit configured to register a predetermined recording apparatus; and a control unit configured to perform control for receiving the content data stored in the storage medium, and to control predetermined processing for causing the recording apparatus to delete the content data stored in the storage medium, wherein the control unit, in a case where the recording apparatus is the predetermined recording apparatus registered by the registration unit, performs control so as to perform the predetermined processing for causing the content data stored in the storage medium to be deleted.

14 Claims, 13 Drawing Sheets

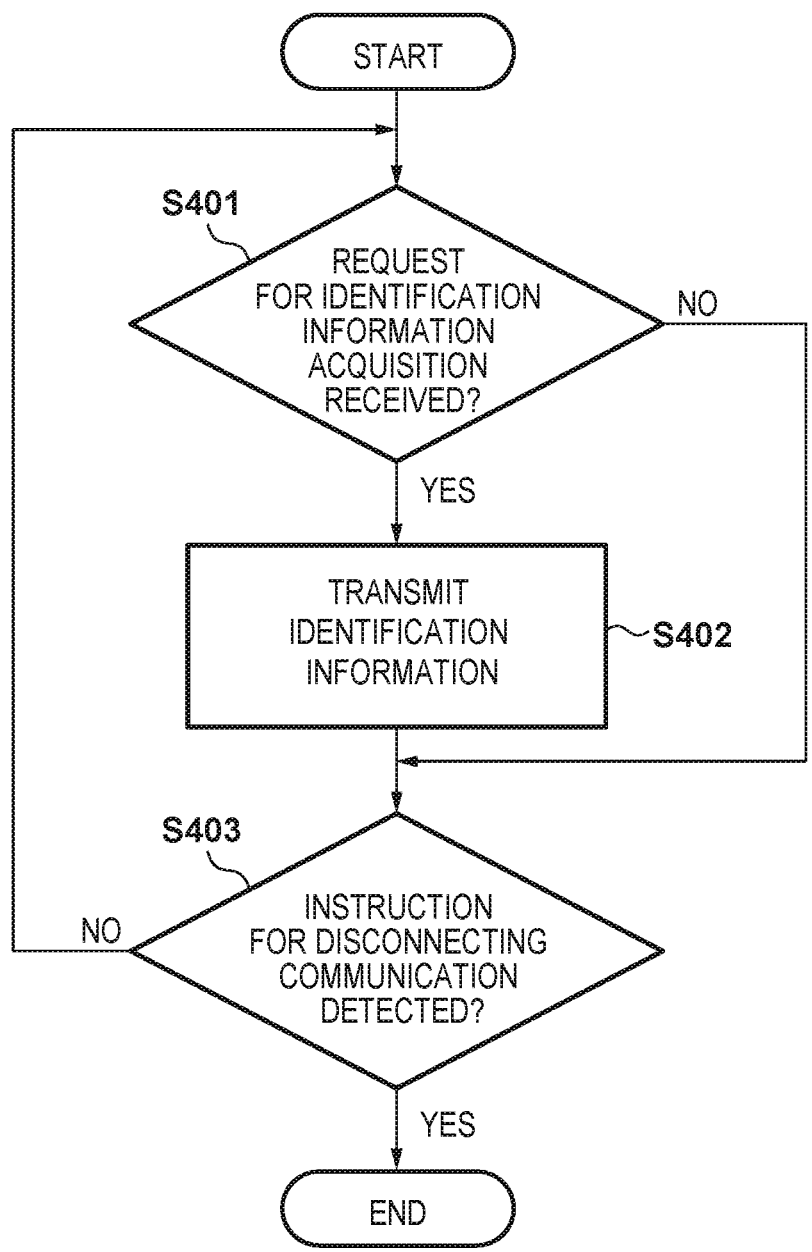

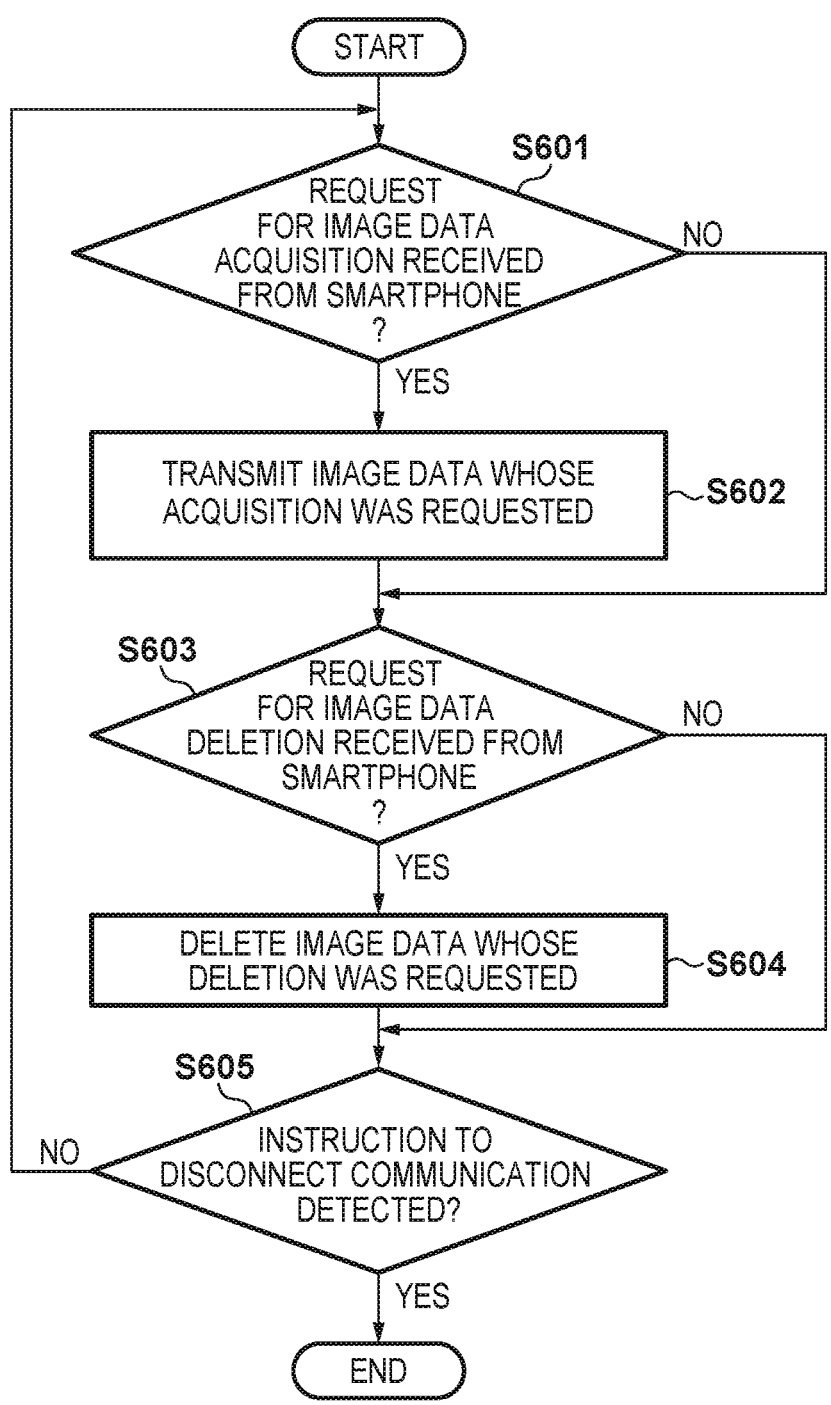

Camera 001

Menu

702 — Browse/save camera images

703 — Application settings

Camera 001

701 —

711 — Register camera currently in communication as my camera

712 — Automatically delete saved images  ON

713 — To menu

723 — Selected images: 4

721 — yyyy/mm/dd

722 — ✓

✓

✓

✓

725 — CANCEL    SAVE — 724

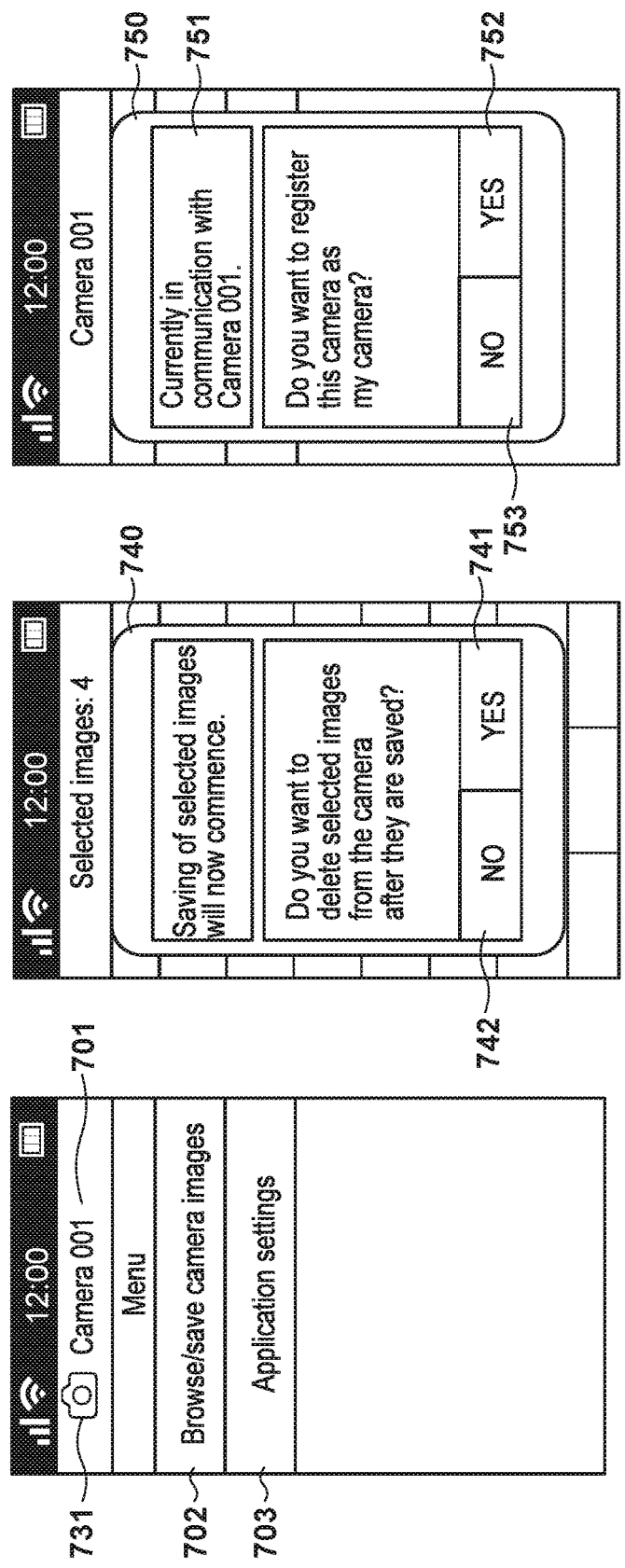

COMMUNICATION APPARATUS, CONTROL METHOD THEREOF, STORAGE MEDIUM, AND COMMUNICATION SYSTEM

BACKGROUND OF THE INVENTION

Field of the Invention

The present invention relates to a communication apparatus, a control method thereof, a storage medium, and a communication system.

Description of the Related Art

In recent years, an increasing number of digital cameras are equipped with a wireless communication function. Digital cameras equipped with a wireless communication function are also known that include functions of transmitting image data recorded in the digital camera to an external communication apparatus and saving the image data to the communication apparatus, or manipulating image data recorded in the digital camera from the communication apparatus. Such functions enable a user to perform operations for saving and deleting image data recorded in a digital camera, from not only the digital camera itself but even from a communication apparatus such as a smartphone.

In a digital camera equipped with the abovementioned functions, there are cases where the user wants to delete image data recorded in the digital camera, for the purpose of securing storage capacity, for example, following image data being transmitted to the communication apparatus. In response to this, Japanese Patent Laid-Open No. 2008-5433 proposes a technology for transmitting image data to a communication apparatus, and automatically deleting the transmitted image data from the storage medium of the digital camera. This proposed technology enables a user who has transmitted image data to a communication apparatus to save the time and effort involved in performing an operation for deleting the image data.

However, a communication apparatus that communicates with a digital camera is not necessarily owned by the owner of the digital camera. For example, there are cases where a digital camera communicates with a communication apparatus that is owned by another person, and transmits and saves image data to that communication apparatus, for the purpose of sharing image data shot using the digital camera with the other person.

In such cases, the conventional technology results in image data recorded in a digital camera being automatically deleted after transmission, irrespective of whether the transmission destination of the image data is a communication apparatus of the owner of the digital camera or a communication apparatus of another person. That is, there is a problem in that image data recorded in a digital camera is deleted contrary to the intention of the owner of the digital camera.

SUMMARY OF THE INVENTION

The present invention has been made in consideration of the abovementioned problems, and realizes a technology that can prevent image data recorded in a recording apparatus from being unintentionally deleted, in the case where image data recorded in the recording apparatus is deleted following image data from the recording apparatus being saved.

In order to solve the aforementioned problems, one aspect of the present invention provides a communication apparatus comprising: a communication unit configured to communicate with a recording apparatus having storage medium and capable of accepting an operation on the content data stored in the storage medium via communication; a registration unit configured to register a predetermined recording apparatus; and a control unit configured to perform control for receiving the content data stored in the storage medium, and to control predetermined processing for causing the recording apparatus to delete the content data stored in the storage medium, wherein the control unit, in a case where the recording apparatus is the predetermined recording apparatus registered by the registration unit, performs control so as to perform the predetermined processing for causing the content data stored in the storage medium to be deleted.

Another aspect of the present invention provides, a control method of a communication apparatus that has a communication unit configured to communicate with a recording apparatus having storage medium and capable of accepting an operation on the content data stored in the storage medium via communication, the method comprising: registering a predetermined recording apparatus; and performing control for receiving the content data stored in the storage medium, and controlling predetermined processing for causing the recording apparatus to delete the content data stored in the storage medium, wherein, in a case where the recording apparatus is the registered predetermined recording apparatus, control is performed so as to perform the predetermined processing for causing the content data stored in the storage medium to be deleted.

Still another aspect of the present invention provides, a communication system comprising a recording apparatus and a communication apparatus, the recording apparatus including: a storage medium; a first communication unit configured to accept, from the communication apparatus, an operation on the content data and to transmit the content data to the communication apparatus; a registration unit configured to register a predetermined communication apparatus; and a deletion unit configured to delete the content data stored in the storage medium, based on the operation, and the communication apparatus including: a second communication unit configured to communicate with the recording apparatus; a control unit configured to perform control for receiving the content data stored in the storage medium, and to perform predetermined control for causing the recording apparatus to delete the content data stored in the storage medium; wherein the deletion unit of the recording apparatus, in a case where the communication apparatus is the predetermined communication apparatus registered by the registration unit, deletes the content data, according to the predetermined control, by the communication apparatus, for causing the content data stored in the storage medium to be deleted.

Yet another aspect of the present invention provides, a non-transitory computer-readable storage medium storing a program for causing a computer to execute a control method of a communication apparatus that has a communication unit configured to communicate with a recording apparatus having storage medium and capable of accepting an operation on the content data via communication, the method comprising: registering a predetermined recording apparatus; and performing control for receiving the content data stored in the storage medium, and controlling predetermined processing for causing the recording apparatus to delete the content data stored in the storage medium, wherein, in a case where the recording apparatus is the registered predetermined recording apparatus, control is performed so as to perform the predetermined processing for causing the content data stored in the storage medium to be deleted.

According to the present invention, it becomes possible to prevent image data recorded in a recording apparatus from being unintentionally deleted, in the case where image data recorded in the recording apparatus is deleted following image data from the recording apparatus being saved.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a flowchart showing a series of operations related to setting of the digital camera in the first embodiment.

FIG. 6 is a flowchart showing a series of operations of the digital camera relating to save processing and delete processing in the first embodiment.

FIGS. 7A to 7F are diagrams showing an example of display on the smartphone in the first embodiment.

DESCRIPTION OF THE EMBODIMENTS

First Embodiment

Hereinafter, an illustrative embodiment of the present invention will be described in detail with reference to the drawings. Note that, hereinafter, an example using any digital camera that is operable from an external apparatus via communication will be described as an example of a recording apparatus. However, the present embodiment is not limited to a digital camera, and is also applicable to any device that enables images or the like to be manipulated from an external apparatus via communication. These devices may include, for example, storage devices, mobile phones such as smartphones, personal computers, game machines, tablet terminals, watch-type information terminals, glasses-type information terminals including head mounted displays, surveillance camera systems, medical devices, and in-vehicle devices. Also, hereinafter, an example using a smartphone will be described as an example of a communication apparatus. However, the present embodiment is not limited to a smartphone, and is also applicable to any device capable of operating the recording apparatus via communication. Such devices may include personal computers, game machines, tablet terminals, watch-type information terminals, and glasses-type information terminals including head mounted displays.

Configuration of Digital Camera

Figure 1A:
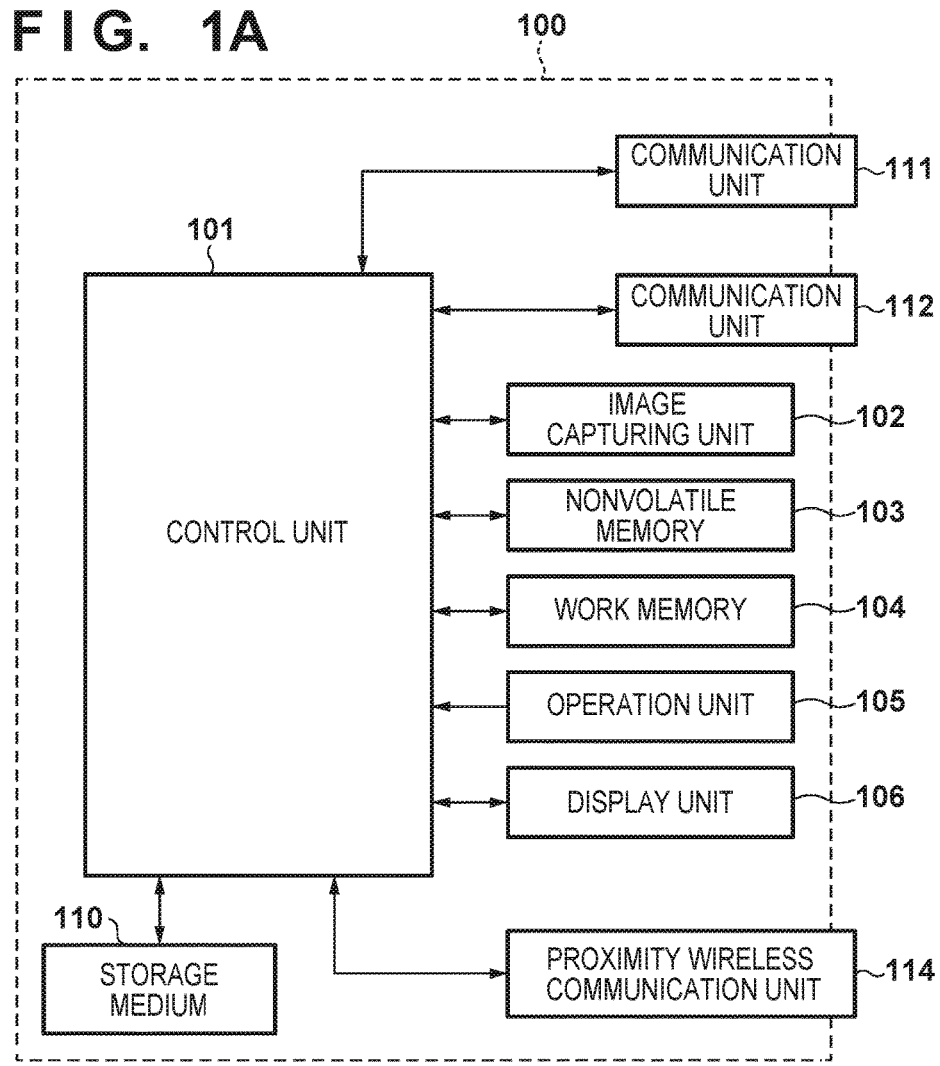
FIGS. 1A to 1C are block diagrams showing an exemplary functional configuration of a digital camera serving as an example of a recording apparatus in embodiments of the present invention.

FIG. 1A is a block diagram showing an exemplary functional configuration of a digital camera 100 as an example of the recording apparatus of the present embodiment. Note that one or more of the functional blocks shown in FIG. 1A may be realized by hardware such as ASIC or a programmable logic array (PLA), or may be realized by a programmable processor such as a CPU or an MPU executing software. Such functional blocks may also be realized by a combination of software and hardware. Accordingly, even in the case where operations are described as being performed by different functional blocks in the following description, these blocks can be realized by the same hardware.

A control unit 101 includes a CPU (or an MPU), and controls each unit of the digital camera 100 in accordance with a result of processing on signals and image data input via an operation unit 105 or a communication unit 111 and the like, by executing programs stored in a nonvolatile memory 103.

An image capturing unit 102 converts light from an object whose image is formed by a photographing optical system included in the image capturing unit 102 into electrical signals, performs processing such as noise reduction on the electrical signals, and outputs digital data (image data). After being stored in a buffer memory, captured image data undergoes predetermined computations by the control unit 101 and is recorded to a storage medium 110.

The nonvolatile memory 103 includes an electrically erasable and recordable nonvolatile memory, and stores, for example, programs executable by the control unit 101 and the like. The programs include, for example, an OS (operating system), which is basic software, and applications that realize applied functions in cooperation with the OS.

A work memory 104 includes a volatile memory, and is used as a buffer memory that temporarily holds image data captured by the image capturing unit 102, an image display memory of a display unit 106, a workspace of the control unit 101, or the like.

An operation unit 105 includes operation members such as switches, buttons and a touch panel, and accepts instructions given to the digital camera 100 by a user. The operation unit 105 includes, for example, a power button for the user to instruct ON/OFF of a power supply of the digital camera 100, a release switch for instructing shooting, and a play button for instructing playback of image data. Also, a communication button for starting or ending communication with an apparatus that is external to the digital camera 100 (also simply called an external apparatus) via the communication unit 111 and a touch panel that is formed on the display unit 106 are also included. Note that the release switch has a SW1 and a SW2. The SW1 turns ON as a result of the release switch entering a so-called half pressed state. In the case where the SW1 is ON, the control unit 101 accepts an instruction for performing shooting preparation such as AF (autofocus) processing, AE (automatic exposure) processing, AWB (automatic white balance) processing and EF (flash pre-emission) processing. Also, the SW2 turns ON as a result of the release switch entering a so-called fully pressed state. In the case where the SW2 is ON, the control unit 101 accepts an instruction for shooting.

The display unit 106 includes a display that is constituted by liquid crystal, organic EL or the like, for example, and performs display of a viewfinder image at the time of shooting, display of shot image data, text display for interactive operation, and the like. Note that the display unit 106 does not necessarily need to be built into the digital camera 100. The digital camera 100 can be connected to an internal or external display unit 106, and need only at least have a display control function of controlling display of the display unit 106.

The storage medium 110 includes a storage medium such as a semiconductor memory or a magnetic disk, and is able to record image data output from the image capturing unit 102. The storage medium 110 may be constituted so as to be removable from the digital camera 100, or may be built into the digital camera 100. That is, the digital camera 100 need only at least have means for accessing the storage medium 110.

The communication unit 111 is a first communication interface for communicating with an external apparatus. The digital camera 100 of the present embodiment is able to exchange data with the external apparatus via the communication unit 111. For example, image data output from the image capturing unit 102 can be transmitted to the external apparatus via the communication unit 111. The communication unit 111 includes an interface and an antenna for communicating with the external apparatus by so-called wireless LAN that conforms to the IEEE 802.11 standard, for example. The control unit 101 realizes wireless communication with the external apparatus by controlling the communication unit 111. Note that the communication method is not limited to wireless LAN and may include an infrared communication method, for example.

A communication unit 112 is a second communication interface for communicating with an external apparatus. The digital camera 100 of the present embodiment is able to exchange data with the external apparatus via the communication unit 112. For example, apparatus identification data that is held by the nonvolatile memory 103 can be transmitted to the external apparatus via the communication unit 112. The communication unit 112 includes an interface for communicating with the external apparatus by so-called Bluetooth (registered trademark) that conforms to the IEEE 802.15.1 standard, for example. In this case, the control unit 101 is able to realize wireless communication with little power consumption although over a narrow communication range compared with the communication unit 111, by controlling the communication unit 112. Note that the communication method is not limited to Bluetooth (registered trademark), and may include, for example, an infrared communication method or wireless LAN known as the IEEE 802.11 standard.

Note that the communication unit 112 of the digital camera 100 in the present embodiment has either a peripheral mode or a central mode. In the case where the communication unit 112 operates in the peripheral mode, the digital camera 100 is operable as a client device in Bluetooth (registered trademark). The digital camera 100, in the case of operating as a client device, performs communication of prescribed data with an external apparatus that operates in the central mode. Note that with regard to authentication with an external apparatus serving as a communication partner, unique information of the external apparatus is held in the nonvolatile memory 103 as a result of performing pairing beforehand.

A proximity wireless communication unit 114 includes a communication unit for realizing contactless short-range communication with an external apparatus, and is constituted, for example, by an antenna for proximity wireless communication, and a modulation-demodulation circuit and a communication controller that are for processing wireless signals. The proximity wireless communication unit 114, by outputting modulated wireless signals from the antenna and demodulating wireless signals received with the antenna, realizes contactless proximity communication that conforms to the ISO/IEC 18092 standard (so-called NFC: Near Field Communication), for example.

Figure 1B:
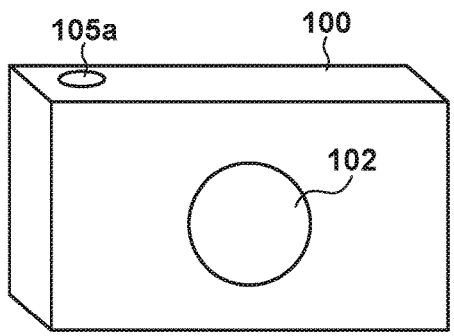
Figure 1C:
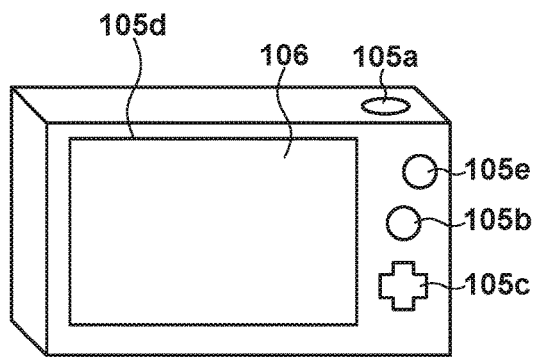

Next, the outer appearance of the digital camera 100 will be described. FIGS. 1B and 1C are diagrams showing an example of the appearance of the digital camera 100. The image capturing unit 102 is disposed on the front surface of the digital camera 100 shown in FIG. 1B. Also, a release switch 105a that is included in the operation unit 105 is, for example, disposed on an upper part of the digital camera 100. The position and size of the image capturing unit 102 and the release switch 105a may be suitably configured, and need not be on the front surface or the upper surface. Also, a menu button 105b, a direction key 105c, a touch panel 105d and the like that are included in the operation unit 105 are, for example, disposed on the back surface of the digital camera 100 shown in FIG. 1C, together with the display unit 106. The position and size of each of the members 105b, 105c and 105d may be suitably configured, similarly to the case of FIG. 1B.

Configuration of Smartphone

Figure 2:
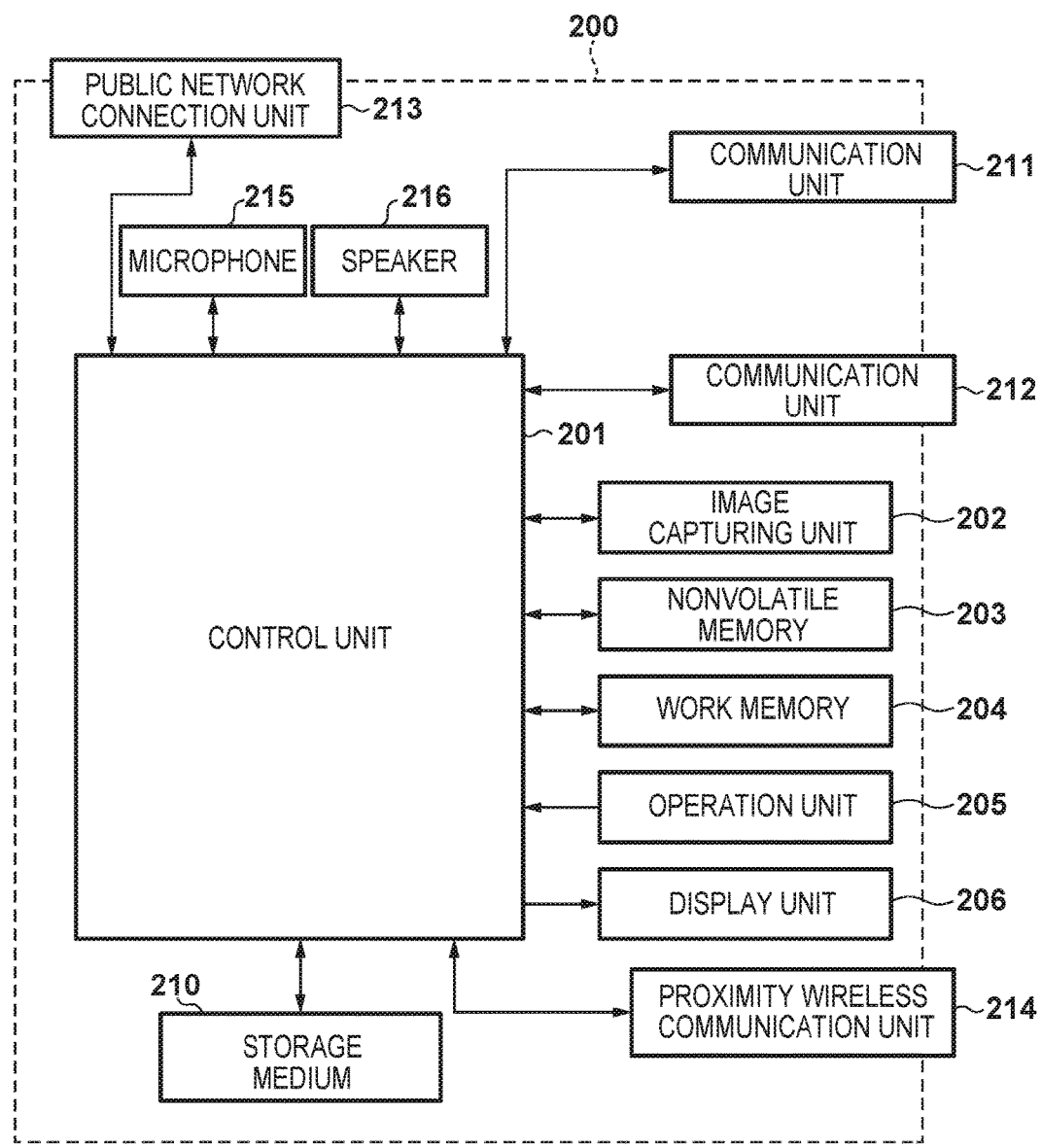
FIG. 2 is a block diagram showing an exemplary functional configuration of a smartphone serving as an example of a communication apparatus in the embodiments.

FIG. 2 is a block diagram showing an exemplary functional configuration of a smartphone 200, which is an example of the communication apparatus of the present embodiment. Note that the functional blocks shown in FIG. 2 may include a mode in which one or more of these functional blocks are realized by a combination of software and hardware, similarly to FIG. 1A.

A control unit 201 includes a CPU (or an MPU), and controls each unit of the smartphone 200 in accordance with signals input via an operation unit 205, by executing programs stored in a nonvolatile memory 203.

An image capturing unit 202 converts light from an object whose image is formed by a photographing optical system that is included in the image capturing unit 202 into electrical signals, performs processing such as noise reduction on the electrical signals, and outputs image data. After being stored in a buffer memory, captured image data undergoes predetermined computations by the control unit 201, and is recorded to a storage medium 210.

The nonvolatile memory 203 includes an electrically erasable and recordable nonvolatile memory, and stores, for example, programs executable by the control unit 201 and the like. The programs include an OS (operating system), which is basic software, and applications that realize applied functions in cooperation with this OS. Also, in the present embodiment, a camera control application for communicating with the digital camera 100 is stored in the nonvolatile memory 203.

A work memory 204 includes a volatile memory, and is used as an image display memory of a display unit 206, a workspace of the control unit 201, or the like.

An operation unit 205 includes operation members such as switches, buttons and a touch panel, and accepts instructions given to the smartphone 200 by a user. The operation unit 205 includes, for example, a power button for the user to instruct ON/OFF of a power supply of the smartphone 200, and a touch panel that is formed on the display unit 206.

The display unit 206 includes a display that is constituted by liquid crystal, organic EL or the like, for example, and performs display of image data, text display for interactive operation, and the like. Note that the display unit 206 does not necessarily need to be built into the smartphone 200. The smartphone 200 can be connected to the display unit 206, and need only at least have a display control function of controlling display of the display unit 206.

The storage medium 210 includes a storage medium such as a semiconductor memory or a magnetic disk, and is able to record various data that is generated by the smartphone 200. For example, the storage medium 210 records image data that is generated in the image capturing unit 202. Also, in the present embodiment, the storage medium 210 is able to record images transmitted from the digital camera 100 to the control unit 201 via the communication unit 211. The storage medium 210 may be constituted so as to be removable from the smartphone 200, or may be built into the smartphone 200. That is, the smartphone 200 need only at least have means for accessing the storage medium 210.

The communication unit 211 is a first communication interface for communicating with an external apparatus. The smartphone 200 of the present embodiment is able to exchange data with the external apparatus via the communication unit 211. For example, image data that is recorded in the digital camera 100 can be acquired via the communication unit 211. The communication unit 211 includes an interface and an antenna for communicating by so-called wireless LAN that conforms to the IEEE 802.11 standard, for example. The control unit 201 realizes wireless communication with the external apparatus by controlling the communication unit 211. Note that the communication method is not limited to wireless LAN and may include an infrared communication method, for example.

A communication unit 212 is a second communication interface for communicating with an external apparatus. The smartphone 200 of the present embodiment is able to exchange data with the external apparatus via the communication unit 212. For example, the smartphone 200 is able to receive image data generated in the digital camera 100 via the communication unit 212. The communication unit 212 includes an interface for communicating with the external apparatus by so-called Bluetooth (registered trademark) that conforms to the IEEE 802.15.1 standard, for example. In this case, the control unit 201 is able to realize wireless communication with little power consumption although over a narrow communication range compared with the communication unit 211, by controlling the communication unit 212. Note that the communication method is not limited to Bluetooth (registered trademark), and may include an infrared communication method or wireless LAN known as the IEEE 802.11 standard, for example.

A public network connection unit 213 is an interface that is used when performing public wireless communication. The smartphone 200 is able to place telephone calls to other devices via the public network connection unit 213, perform data communication, and the like. At the time of a telephone call, the control unit 201 performs input and output of audio signals via a microphone 215 and a speaker 216. Although the public network connection unit 213 is described taking an interface for performing communication using 3G, for example, as an example, other communication methods apart from 3G, such as LTE, WiMAX, ADSL, FTTH and so-called 4G, may be used. Note that the communication unit 211, the communication unit 212 and the public network connection unit 213 need not necessarily be constituted by independent hardware, and can also share one antenna, for example.

A proximity wireless communication unit 214 includes a communication unit for realizing contactless short-range communication with an external apparatus, and is constituted by an antenna for wireless communication, and a modulation-demodulation circuit and a communication controller that are for processing wireless signals. The proximity wireless communication unit 214 realizes contactless short-range communication by outputting modulated wireless signals from the antenna and demodulating wireless signals received with the antenna. Contactless short-range wireless communication includes communication that conforms to the ISO/IEC 18092 standard (so-called NFC), for example. The proximity wireless communication unit 214, upon receiving a data readout request from another device, outputs response data, based on data that is stored in the nonvolatile memory 203. For example, the smartphone 200 operates in one of a card reader mode, a card writer mode and a P2P mode that are defined by the NFC standard, through the proximity wireless communication unit 214, and primarily acts as an initiator. On the other hand, the digital camera 100 acts as a target, for example, via the proximity wireless communication unit 114.

Outline of System and Camera Control Application

The communication system according to the present embodiment is constituted by the digital camera 100 and the smartphone 200, and the digital camera 100 and the smartphone 200 communicate directly rather than via another access point. That is, the digital camera 100 forms a wireless LAN network as a simple access point using the communication unit 111. The digital camera 100 starts periodical transmission of a beacon signal, in the case of operating as a simple access point. The smartphone 200 detects the beacon signal and participates in the wireless LAN network formed by the digital camera 100, using the communication unit 211. The digital camera 100 and the smartphone 200 enter a state of being able to transmit and receive data (establish communication between the devices), through mutual device discovery, device capability acquisition and the like. Note that the communication method of the digital camera 100 and the smartphone 200 is not limited to the above. For example, the communication method may be an infrastructure mode in which the digital camera 100 and the smartphone 200 participate in a network that is formed by an external access point, and communicate on that network.

Upon the digital camera 100 and the smartphone 200 establishing communication, the user of the smartphone 200 becomes able to browse thumbnails of image data that is recorded in the digital camera 100 and to freely save image data to the smartphone 200, using a camera control application that operates in the smartphone 200.

Next, an outline and exemplary operations of the camera control application according to the present embodiment will be described, with reference to FIGS. 7A and 7B (FIGS. 7C to 7F will be discussed separately later). The smartphone 200, upon establishing communication with the digital camera 100, displays a menu screen of the camera control application. Controls for transitioning to an image browsing screen and an application settings screen are disposed on the menu screen. On the image browsing screen, the user is able to use a function of browsing thumbnails of image data recorded in the digital camera and freely saving image data to the smartphone. On the other hand, on the application settings screen, the user is able to check settings related to operations of the camera control application and change the settings if necessary.

FIG. 7A shows an example of the menu screen of the camera control application that is displayed on the smartphone 200. The model name of the digital camera 100 that has established communication with the smartphone 200 that is being used is displayed in a camera information display region 701. A nickname freely given to the digital camera by the user and the MAC address of the digital camera, for example, may also be included in the information that is displayed in the camera information display region.

An image browse/save button 702 is a button for transitioning to the image browsing screen. Upon the image browse/save button 702 being pressed by the user, the smartphone 200 switches display to the image browsing screen which will be discussed separately later. An application settings button 703 is a button for transitioning to the application settings screen.

Upon the application settings button 703 being pressed by the user, the smartphone 200 switches display to the application settings screen. On the application settings screen according to the present embodiment, the user is able to change the automatic image deletion setting and perform my camera registration. The automatic image deletion setting enables the user to set whether to perform processing for deleting image data (also simply called a camera image) recorded in the digital camera 100 when the camera image has been saved to the smartphone 200. That is, in the case where the setting value of the automatic image deletion setting is ON, camera images on the digital camera 100 are deleted after saving the images to the smartphone 200. As a result of this processing, the user is able to save the time and effort involved in deleting camera images manually, in the case where he or she desires to delete camera images on the digital camera 100 when the camera images have been saved to an external apparatus. On the other hand, in the case where the setting value of the automatic image deletion setting is OFF, the camera images on the digital camera 100 are not deleted, even when the camera images are saved to the smartphone 200.

Exemplary Operations on Application Settings Screen

Next, exemplary operations on the application settings screen will be described. On the application settings screen, the user is able, as my camera registration, to register his or her digital camera. "My camera" is the designation of the camera that is registered in the application. It is envisioned that a camera that is owned by the user of the application will be registered as my camera. Upon the user performing my camera registration, the smartphone 200 holds identification information of the digital camera 100 as information that is managed by the camera control application. In this embodiment, the case where the serial number of the digital camera 100 is used as an example of identification information will be described as an example. However, other information such as the MAC address or model name of the digital camera or a nickname freely given to the digital camera by the user, for example, may be used, as long as the digital camera 100 is identifiable.

In the case where a digital camera is registered as my camera, the camera control application enables special settings to be configured and dedicated display and functions to be implemented, only in the case where the smartphone 200 is currently in communication with the digital camera registered as my camera. For example, in the present embodiment, the abovementioned automatic image deletion setting can be applied, only in the case where the smartphone 200 is currently in communication with the digital camera registered as my camera. That is, deletion of image data recorded in the digital camera is performed according to the setting value (ON/OFF) of automatic image deletion, only in the case where the smartphone 200 is currently in communication with my camera. On the other hand, in the case where the digital camera that is currently in communication is not registered as my camera, deletion of image data recorded in the digital camera is not performed, irrespective of the setting value of automatic image deletion.

FIG. 7B shows an example of the application settings screen according to the present embodiment that is displayed on the smartphone 200. A my camera registration button 711 is a button for registering the digital camera that is currently in communication as my camera. In the case where the my camera registration button 711 is pressed, the smartphone 200 holds the identification information of the digital camera 100 that is currently in communication. The smartphone 200 uses the held identification information in determining whether the digital camera 100 that is currently in communication is my camera.

An automatic image deletion setting button 712 is a button for switching the set state (ON/OFF) of the automatic image deletion setting. In the case where the automatic image deletion setting button 712 is pressed, the smartphone 200 switches the set state of automatic image deletion, in accordance with the state in which the automatic image deletion setting button 712 is designated. Also, the currently set state is displayed in the switch display part on the right of the button. In the present embodiment, the initial state is setting OFF.

A menu transition button 713 is a button for switching display to the menu screen of FIG. 7A. In the case where the menu transition button 713 is pressed, the smartphone 200 ends the application settings screen and returns display to the menu screen.

Series of Operations Related to User Operations of Application Settings Screen

Figures 3A, 3B:
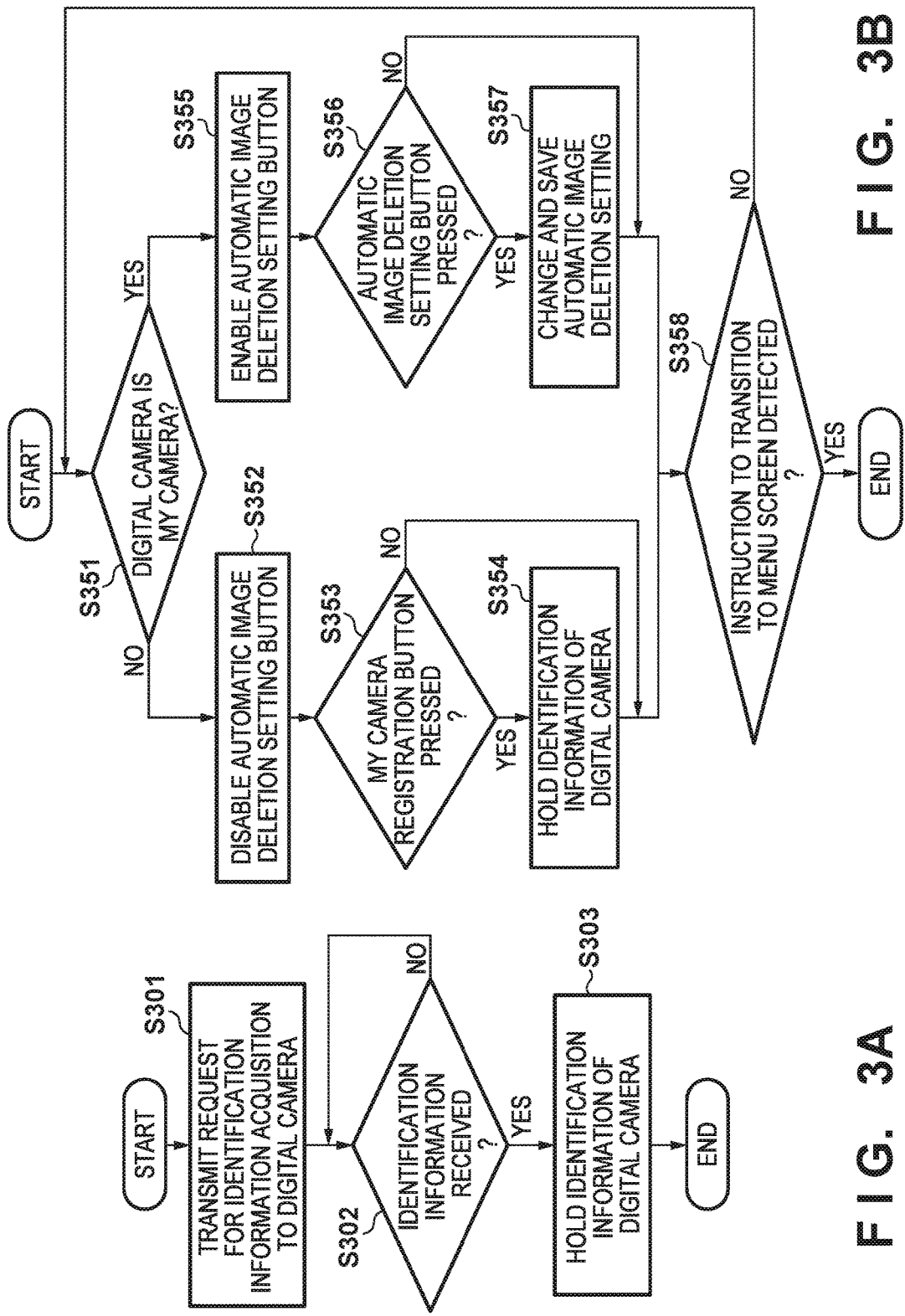
FIGS. 3A to 3B are flowcharts showing a series of operations related to setting of the smartphone in a first embodiment.

Next, a series of operations in the smartphone 200 and the digital camera 100 related to user operations (change of automatic image deletion setting and registration of my camera) on the application settings screen will be described, with reference to FIGS. 3A, 3B and 4. Note that, in the description of subsequent flowcharts, the smartphone 200 is described as performing the processing, but in actual fact the control unit 201 realizes the various processing by extracting and executing programs stored in the nonvolatile memory 203. Similarly, in the case where the digital camera 100 is described as performing processing, the control unit 101 realizes the various processing by loading and executing programs stored in the nonvolatile memory 103.

Series of Operations Related to Setting of Smartphone (Acquisition of Camera Identification Information)

In the present embodiment, as described above, the smartphone 200, when displaying the main screen after establishing communication with the digital camera 100, acquires the identification information of the digital camera 100, and uses the acquired identification information in the camera control application. FIG. 3A shows a series of operations of processing for the smartphone 200 to acquire identification information of the digital camera 100 in the present embodiment. Note that this series of operations is started from the point in time that the smartphone 200 establishes communication with the digital camera 100.

In step S301, the smartphone 200 transmits a request for identification information acquisition to the digital camera 100. For example, the smartphone 200 transmits an acquisition request in which the serial number of the digital camera 100 is set as identification information, via the communication unit 211.

In step S302, the smartphone 200 determines whether identification information has been received from the digital camera 100. If identification information is included in the signal received via the communication unit 211, the smartphone 200 determines that identification information has been received from the digital camera 100, and advances the processing to step S303. On the other hand, if a signal has not been received via the communication unit 211 or identification information is not included in the received signal, the smartphone 200 returns the processing to step S302 again in order to wait for receipt of identification information. Note that the operation of the digital camera 100 transmitting identification information corresponds to step S402 in FIG. 4 which will be discussed later.

In step S303, the smartphone 200 holds the identification information of the digital camera 100 received in step S302 in the work memory 204, for example. The smartphone 200 then ends this series of operations when writing of the identification information to the work memory 204 ends. Note that the identification information held at step S303 is used in processing for my camera registration and processing for collating the identification information of my camera that has been registered which will be discussed later. The smartphone 200 holds the identification information until communication with the digital camera 100 is disconnected, for example.

Series of Operations Related to Setting of Digital Camera (Acquisition of Camera Identification Information)

FIG. 4 shows a series of operations of the processing that the digital camera 100 performs, at the time of the smartphone 200 acquiring the identification information of the digital camera 100, in the present embodiment. Note that this series of operations is started from the point in time that the digital camera 100 establishes communication with the smartphone 200.

In step S401, the digital camera 100 determines whether a request for identification information acquisition has been received. The request for identification information acquisition is transmitted from the smartphone 200 in the above-mentioned step S301. If a request for identification information acquisition is included in the signal received from the digital camera 100 via the communication unit 111, the digital camera 100 determines that a request for identification information acquisition has been received, and advances the processing to step S402. On the other hand, if a signal has not been received from the digital camera 100 via the communication unit 111, or a request for identification information acquisition is not included in the received signal, the smartphone 200 determines that a request for identification information acquisition has not been received, and advances the processing to step S403.

In step S402, the digital camera 100 transmits the identification information of the digital camera 100 to the smartphone 200. For example, the digital camera 100 reads the serial number that is stored in the nonvolatile memory 103 or the like as the identification information, and transmits the read serial number via the communication unit 111.

In step S403, the digital camera 100 determines whether an instruction for disconnecting communication with the smartphone 200 has been detected. For example, if the communication button 105e is pressed while the digital camera 100 is establishing communication with the smartphone 200, the digital camera 100 determines that a communication disconnection instruction has been detected, and ends this series of operations. On the other hand, if the communication button 105e has not been pressed while communication is being established, the smartphone 200 determines that a communication disconnection instruction was not detected, and returns the processing to step S401. Note that the disconnection instruction is not limited to a user operation on the operation unit 105, and may, for example, be instructed by a user operation not being performed on the digital camera 100 for a given period of time. Also, disconnection may be instructed by the disconnection request from the smartphone 200.

Series of Operations Related to Setting of Smartphone (My Camera Registration and Automatic Deletion Setting)

Next, processing that is performed by the smartphone 200 will be described, in relation to my camera registration and automatic deletion setting, with reference to FIG. 3B. FIG. 3B shows a series of operations of processing that is performed by the smartphone 200 at the time that my camera registration and automatic deletion setting are carried out on the smartphone 200 in the present embodiment. Note that this series of operations is started from the point in time that the smartphone 200 detects that the application settings button 703 on the main screen shown in FIG. 7A was pressed and displays the application settings screen shown in FIG. 7B.

In step S351, the smartphone 200 determines whether the digital camera 100 that is currently in communication is registered as my camera. For example, the smartphone 200 determines whether the digital camera 100 is registered as my camera, by collating the identification information that is already held as information on my camera with the identification information of the digital camera 100 held at step S303. The smartphone 200 advances the processing to step S355 if it is determined that the digital camera 100 is my camera, and advances the processing to step S352 if, on the other hand, it is determined that the digital camera 100 is not my camera. Here, in the camera control application, if my camera has not been registered yet, the smartphone 200 determines that the digital camera 100 is not registered as my camera, and advances the processing to step S352.

In step S352, the smartphone 200 disables the automatic image deletion setting item. If the automatic image deletion setting item has been disabled, the smartphone 200 disregards an operation on the automatic image deletion setting button 712 by the user (performs no processing), even when pressing of this button by the user is detected. Note that the smartphone 200 may be configured to clearly show that the automatic image deletion setting cannot be changed by switching the display method, such as graying out and displaying the automatic image deletion setting button 712 as disabled, or hiding the automatic image deletion setting button 712.

In step S353, the smartphone 200 determines whether pressing of the my camera registration button 711 has been detected. If a button press on the button has been received via the operation unit 205, the smartphone 200 determines that pressing of the my camera registration button 711 has been detected, and advances the processing to step S354. On the other hand, if a button press on this button has not been received via the operation unit 205 within a predetermined time period, the smartphone 200 determines that pressing of registration button has not been detected, and advances the processing to step S358.

In step S354, the smartphone 200 holds, as the identification information of my camera, the identification information of the digital camera 100 held at step S303, and advances the processing to step S358. Note that, in the present embodiment, plural sets of identification information of my camera can be held, but a configuration may be adopted in which, in the case where my camera registration is newly performed, registered my camera identification information is replaced.

On the other hand, in step S355, the smartphone 200 enables the automatic image deletion setting item. In step S356, the smartphone 200 determines whether pressing of the automatic image deletion setting button 712 has been detected. For example, if a button press has been received via the operation unit 205, the smartphone 200 determines that a button press has been detected, and advances the processing to step S357. On the other hand, if a button press has not been received via the operation unit 205, the smartphone 200 determines that a button press was not detected, and advances the processing to step S358.

In step S357, the smartphone 200 changes the setting value of the automatic image deletion setting (i.e., interchanges the ON setting and the OFF setting), and holds the changed setting value in the work memory 204. Also, display in the switch display part on the automatic image deletion setting button is updated.

In step S358, the smartphone 200 determines whether an instruction to transition to the menu screen has been detected. In the present embodiment, the smartphone 200 determines that an instruction to transition to the menu screen has been detected, if the menu transition button 713 has been pressed. If it is determined that an instruction to transition to the menu screen has been detected, the smartphone 200 ends the series of operations related to this processing. On the other hand, if it is determined that a transition instruction has not been detected, the smartphone 200 returns the processing to step S303 and repeats the abovementioned processing.

Exemplary User Operation of Image Browsing Screen

Next, browsing of thumbnails of camera images and a user operation for saving image data, on the image browsing screen of the camera control application, will be described.

The smartphone 200 transmits a request for image ID list acquisition to the digital camera 100, upon detecting that the image browse/save button 702 on the menu screen shown in FIG. 7A has been pressed. Note that with regard to each of the recorded image data (i.e., camera images), the digital camera 100, in order to manage related data including the image data itself and thumbnails thereof, gives a unique identification ID to each of these related data groups. The smartphone 200 of the present embodiment then, at the time of acquiring image data and thumbnails from the digital camera 100, transmits an acquisition request designating target image data and thumbnails using the identification IDs. Accordingly, the smartphone 200 first acquires an image ID list listing the identification IDs for all the images recorded in the digital camera 100, in order to display the image browsing screen. The smartphone 200 then issues a request for thumbnail acquisition with regard to each of the identification IDs included in the image ID list, and acquires thumbnails from the digital camera 100. Thereafter, the smartphone 200 displays an image browsing screen that displays the thumbnails on the display unit 206.

FIG. 7C shows an example of the image browsing screen according to the present embodiment that is displayed on the smartphone 200. The thumbnails received from the digital camera 100 are displayed in a thumbnail display region 721 of the image browsing screen. In the thumbnail display region 721, thumbnails that are pressed by a press operation on the touch panel of the operation unit 205 or the like enter a selected state. At this time, a selection mark 722 is displayed in the thumbnail display region corresponding to the thumbnails that are in the selected state. When the thumbnail display region in which the selection mark 722 is displayed is pressed again, the selected state of the thumbnail is cancelled and the selection mark 722 is not displayed. The number of thumbnails that are in the selected state at the current point in time is displayed on a selection number display region 723.

When a save button 724 is pressed by a press operation, image data corresponding to the thumbnails in the selected state is acquired from the digital camera 100, and saved in the smartphone 200. When a cancel button 725 is pressed by a press operation, display of the image browsing screen is ended, and thereafter the menu screen is displayed.

Next, processing for the smartphone 200 to save image data (save processing) and delete image data (delete processing) in the digital camera 100, in the case where the automatic image deletion setting is ON and the smartphone 200 is currently in communication with my camera, will be described.

Series of Operations related to User Operations on Image Browsing Screen Series of Operations related to Save Processing and Delete Processing in Smartphone A series of operations in the smartphone 200 at the time of performing save processing and delete processing of image data will be described, with reference to FIG. 5. Note that this processing is started in the case where the save button 724 is pressed in a state where the user has selected one or more thumbnails on the image browsing screen.

In step S501, the smartphone 200 adds all of the identification IDs of the thumbnails that are in the selected state to a request image list. The request image list lists the identification IDs of images with respect to which a request for acquisition will be issued to the digital camera 100. Also, the identification IDs of the images are identification IDs that are included in the abovementioned image ID list acquired from the digital camera 100. The processing described in subsequent steps step S502 to step S510 is executed for each identification ID in the request image list.

In step S502, the smartphone 200 determines whether the request image list is empty. The smartphone 200 ends this series of operations, if the request image list is checked and the list is empty. On the other hand, if it is determined that the request image list is not empty, the smartphone 200 advances the processing to step S503.

In step S503, the smartphone 200 transmits a request for image data acquisition to the digital camera 100, using the identification ID at the head of the request image list. In step S504, the smartphone 200 determines whether image data has been received from the digital camera 100. Note that the image data that is received at this step corresponds to the image that is transmitted from the digital camera 100 in step S602 of FIG. 6. The smartphone 200 advances the processing to step S505, if image data has been received from the digital camera 100 via the communication unit 211. On the other hand, if image data has not been received from the digital camera 100 via the communication unit 211 during a predetermined time period, the smartphone 200 returns the processing to step S504, in order to wait for reception of image data again.

In step S505, the smartphone 200 saves the image data received at step S504 to the storage medium 210. In step S506, the smartphone 200 determines whether the save processing performed at step S505 was completed normally. The smartphone 200 advances the processing to step S510, if the save processing was not completed normally due to the storage medium 210 having insufficient remaining capacity, for example. On the other hand, if the save processing was completed normally, the smartphone 200 advances the processing to step S507.

In step S507, the smartphone 200 determines whether the digital camera 100 that is currently in communication is the digital camera registered as my camera. The determination as to whether the digital camera 100 is my camera is performed similarly to step S351. The smartphone 200 advances the processing to step S508, if it is determined that the digital camera 100 is my camera. On the other hand, the smartphone 200 advances the processing to step S510, if it is determined that the digital camera 100 is not my camera.

In step S508, the smartphone 200 determines whether the automatic image deletion setting in the application settings is ON. The smartphone 200 refers to the setting value of the automatic image deletion setting held in the work memory 204 in step S357, for example, and, if the setting value is ON, determines that the automatic image deletion setting is ON, and advances the processing to step S509. On the other hand, if the setting value referred to is OFF, the smartphone 200 determines that the automatic image deletion setting is not ON, and advances the processing to step S510.

In step S509, the smartphone 200 transmits a request for image data deletion to the digital camera 100, using the identification ID at the head of the request image list again. Note that the identification ID that is used in the deletion request is the same as the identification ID of the image data whose acquisition was requested at step S503 and that was saved in step S505.

In step S510, the smartphone 200 removes the identification ID at the head from the request image list as having been processed, and returns the processing to step S502 in order to process the next identification ID on the request image list.

Figure 5:
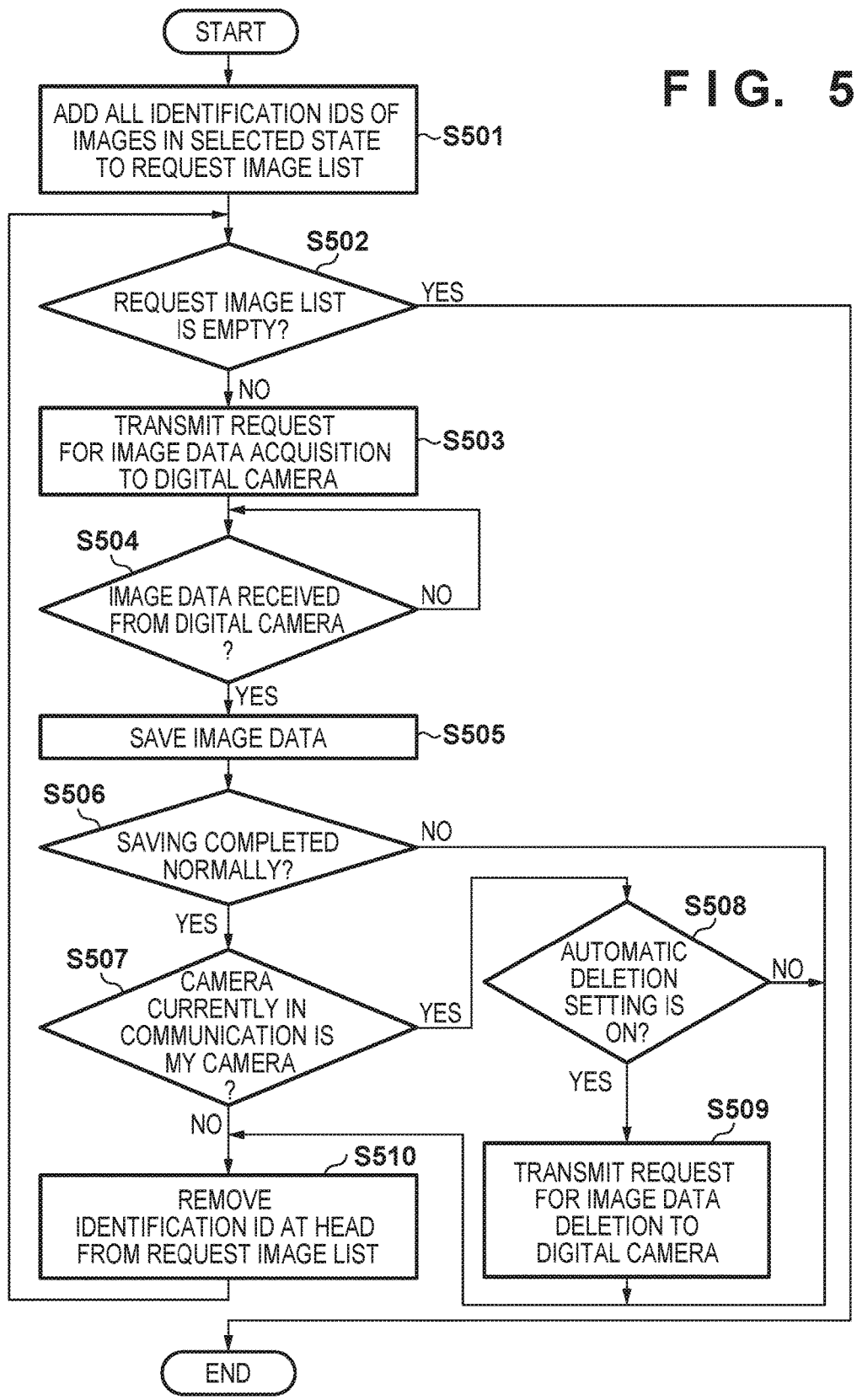
FIG. 5 is a flowchart showing a series of operations related to save processing and delete processing of the smartphone in the first embodiment.

Note that although, in the series of operations shown in FIG. 5, an example in which a transmission request and a deletion request are sequentially transmitted for every image data was described, a configuration may be adopted in which saving and deletion of image data is performed collectively for all the image data. That is, all of the image data may be initially received and saved, and, thereafter, a deletion request may be sent collectively for all of the image data that has been saved.

Series of Operations Related to Save Processing and Delete Processing in Digital Camera Next, a series of operations in the digital camera 100 at the time of performing save processing and delete processing of image data will be described, with reference to FIG. 6. Note that this processing is started at the point in time that the smartphone 200 establishes communication with the digital camera 100. Note that the series of operations shown in FIG. 6 and the series of operations shown in FIG. 4 will be described as operations that can be processed in parallel in the digital camera 100. However, it need not necessarily be possible to process these operations in parallel in the digital camera 100, and a configuration may be adopted in which the start of each series of operations is triggered by a specific operation or communication.

In step S601, the digital camera 100 determines whether a request for image data acquisition transmitted from the smartphone 200 in step S503 has been received. If a request for image data acquisition has been received via the communication unit 111, the digital camera 100 determines that the acquisition request has been received, and advances the processing to step S602. On the other hand, if it determines that a request for image data acquisition has not been received via the communication unit 111 during a predetermined time period, the digital camera 100 advances the processing to step S603. In step S602, the digital camera 100 specifies the identification ID included in the acquisition request received at step S601, reads out the image data corresponding to the identification ID from the storage medium 110, and transmits the read image data to the smartphone 200.

In step S603, the digital camera 100 determines whether a request for image data deletion transmitted from the smartphone 200 in step S509 has been received. If it is determined that a request for image data deletion has been received via the communication unit 111, the digital camera 100 advances the processing to step S604. On the other hand, if it is determined that a request for image data acquisition has not been received via the communication unit 111 during a predetermined time period, the digital camera 100 advances the processing to step S605.

In step S604, the digital camera 100 deletes the image data whose deletion request was received in step S603. Specifically, the digital camera 100 specifies the image data corresponding to the identification ID that is included in the deletion request from among the image data that is recorded in the storage medium 110, and deletes that image data. A configuration may be adopted in which the digital camera 100, in the case where deletion of image data has been completed, informs the user that deletion of image data has been completed, by displaying notification of deletion completion on the display unit 106. Note that a configuration may be adopted in which the digital camera 100 transmits a notification that deletion of image data has been completed to the smartphone 200 via the communication unit 111, and displays the notification of deletion completion on the display unit 206 of the smartphone 200.

In step S605, the digital camera 100 determines whether an instruction to disconnect communication with the smartphone 200 has been detected, similarly to step S403. If it is determined that an instruction to disconnect communication has been detected, the digital camera 100 ends the series of operations related to this processing. On the other hand, if it is determined that an instruction to disconnect communication has not been detected, the digital camera 100 returns the processing to step S601 again.

Note that in the case where the digital camera 100 is not registered as my camera, image data saved on the smartphone 200 is not deleted from the digital camera 100, even when the setting value of the automatic image deletion setting is ON. However, the user who set the setting value of the automatic image deletion setting to ON may possibility think that image data will be deleted from the digital camera 100. A configuration may thus be adopted that enables the user to more readily grasp whether automatic deletion of saved image data will be implemented. For example, the smartphone 200 may be configured to perform dedicated display showing that the smartphone 200 is currently in communication with my camera, in the case where the digital camera 100 that is currently in communication is registered as my camera. FIG. 7D shows an example of a menu screen that the smartphone 200 displays during communication with my camera. A my camera icon 731 is displayed on the menu screen only during communication with the digital camera registered as my camera. Note that a configuration may be adopted in which, apart from the abovementioned display, the text color and background color of the camera information display region is changed or specific text such as "my camera" is displayed, for example. Also, a configuration may be adopted in which a mark or text showing whether automatic deletion will be performed is clearly indicated on the image browsing screen.

In the present embodiment, as described above, a configuration was adopted in which the identification information of the digital camera 100 is registered in the smartphone 200, and the smartphone 200 determines whether the identification information of the digital camera that is currently in communication matches the identification information registered in the smartphone 200. The smartphone 200 was configured to save image data acquired from the digital camera 100 and delete the image data in the digital camera 100, in the case where the identification information matched. This makes it possible to prevent image data recorded in the digital camera 100 from being unintentionally deleted, in the case where the image data recorded in the digital camera 100 is deleted following image data from the digital camera 100 being saved.

Note that although the present embodiment described an example in which the automatic image deletion setting and the my camera registration are performed from the application settings screen, the method of this setting and registration is not limited thereto. With regard to the automatic image deletion setting, a configuration may be adopted in which, for example, the user is asked whether or not to delete the image data from the digital camera 100, when the smartphone 200 starts image data save processing while communicating with my camera.

FIG. 7E shows an example of an inquiry dialog for confirming automatic deletion. In the case where the save button 724 is pressed on the image browsing screen, the smartphone 200 displays an inquiry dialog 740 shown in FIG. 7E, only in the case where the digital camera that is currently in communication is my camera. In the case where a YES button 741 is pressed in the inquiry dialog 740, the smartphone 200 determines that the setting value of the automatic deletion setting is ON, and implements the series of operations described in FIG. 5. On the other hand, in the case where a NO button 742 is pressed in the inquiry dialog 740, the smartphone 200 implements the series of operations described in FIG. 5, with the setting value of the automatic deletion setting set to OFF. This enables the user to readily select, with respect to each save operation, whether or not to delete the image data from the digital camera. Furthermore, a configuration may be adopted in which this automatic deletion inquiry is displayed for every image data.

Also, in the present embodiment, a configuration was adopted in which my camera registration is performed on the application settings screen shown in FIG. 7B. However, a configuration may be adopted in which, for example, the smartphone 200 determines whether the digital camera 100 that is currently in communication is my camera, when communication between the digital camera 100 and the smartphone 200 is established, and displays a my camera registration screen in the case where the digital camera 100 is not my camera. That is, after performing the series of operations shown in FIG. 3A, the smartphone 200 may perform processing for determining whether the digital camera 100 that is currently in communication is my camera and displaying the my camera registration screen.

For example, FIG. 7F shows an example of the my camera registration screen. In the example shown in FIG. 7F, a my camera registration dialog 750 is displayed on the menu screen as the my camera registration screen. On the information display region 751, the communication status is displayed together with the model name of the digital camera. When a YES button 752 is pressed in this dialog, the smartphone 200 performs the processing of step S354 described in FIG. 3B. Thereafter, the smartphone 200 hides the dialog of FIG. 7F when the my camera registration is completed. On the other hand, when a NO button 753 is pressed, the smartphone 200 hides the dialog of FIG. 7F without performing my camera registration.

Furthermore, the present embodiment described, as the my camera determination method that is performed by the smartphone, an example in which the smartphone performs the determination based on identification information acquired from the digital camera and registered and the identification information of the digital camera that is currently in communication. However, the determination method is not limited thereto. For example, a configuration may be adopted in which the identification information of my camera is acquired from a server (e.g., Web server) holding the identification information, rather than from a digital camera. Also, a configuration may be adopted in which, rather than performing determination using the identification information of the digital camera, the digital camera is identified as my camera and processing is performed, only in the case where communication is performed between the digital camera and the smartphone using proximity wireless communication, for example. Also, a configuration may be adopted in which the digital camera is identified as my camera and processing is performed, only in the case where the smartphone and the digital camera are paired using Bluetooth (registered trademark). Also, a configuration may be adopted in which the number of times that communication is established with the smartphone is recorded, and a digital camera that has established communication a prescribed number of times or more is identified as my camera. This enables setting or identification of my camera to be performed based on a use mode of the user, and the time and effort involved in performing my camera registration to be reduced.

Second Embodiment

Next, a second embodiment will be described. In the first embodiment, the user registers his or her own digital camera as "my camera" in the smartphone 200, and the smartphone 200 determines whether the digital camera communicating with the smartphone 200 is my camera and controls deletion of image data recorded in the digital camera. The present embodiment differs in that the user registers his or her own smartphone as "my smartphone" in a digital camera, and the digital camera controls deletion of image data, and the configurations of the digital camera 100 and the smartphone 200 are the same as the first embodiment. The same reference numerals will thus be given to constituent elements and steps that are the same and description will focus on the differences, with redundant description being omitted. Note that it is assumed that a smartphone owned by the user of the digital camera is registered as my smartphone.

The digital camera 100 holds the identification information of the smartphone, in the case where my smartphone registration has been processed. The digital camera 100 holds the serial number of the smartphone 200 as identification information of the smartphone 200, for example. Note that the identification information is not limited thereto, and any information capable of identifying the smartphone can be used. For example, the MAC address or model name of the smartphone, or a nickname freely given to the smartphone by the user may be used. A configuration can be adopted in which, in the case where a specific smartphone is registered as my smartphone in the digital camera, a special setting can be enabled or a dedicated display or function can be implemented, only during communication with the smartphone registered as my smartphone.

In the present embodiment, the digital camera 100 executes deletion of image data according to the setting value (ON/OFF) of the automatic image deletion setting in the smartphone 200, only in the case where the digital camera 100 is currently in communication with the smartphone 200 registered as my smartphone. On the other hand, in the case where the smartphone 200 that is currently in communication is not my smartphone, the digital camera 100 does not perform deletion of image data recorded in the digital camera 100, irrespective of the setting value of automatic image deletion in the smartphone 200.

Series of Operations Related to Setting of Digital Camera (Acquisition of Camera Identification Information and My Smartphone Registration)

Figure 8:
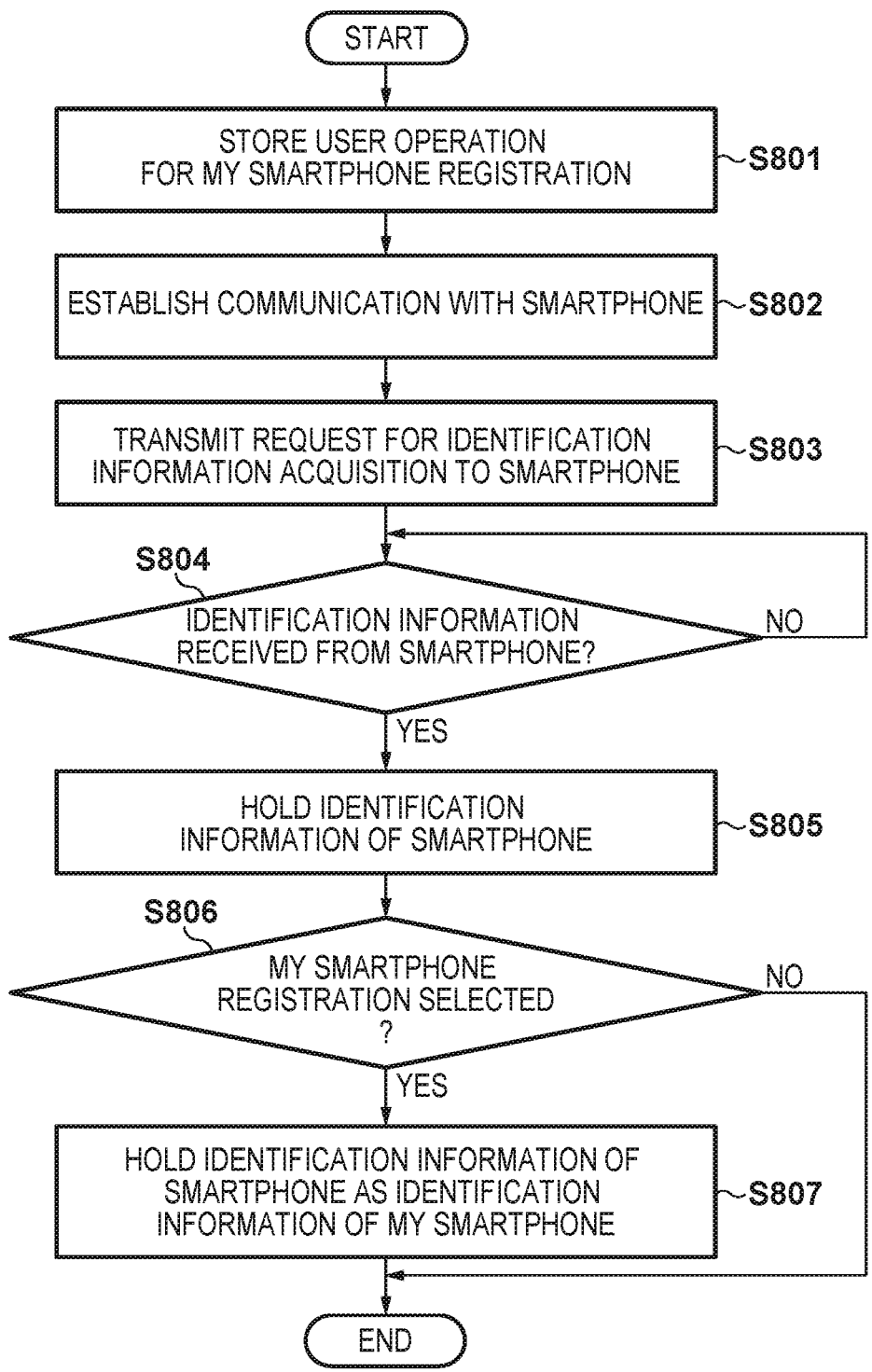
FIG. 8 is a flowchart showing a series of operations related to setting of the digital camera in a second embodiment.
Figure 12A:
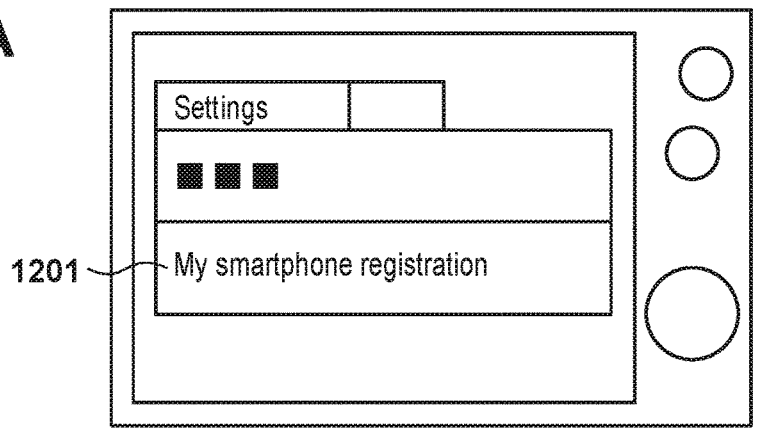
FIGS. 12A to 12C are diagrams showing an example of display on the digital camera in the second embodiment.
Figure 12B:
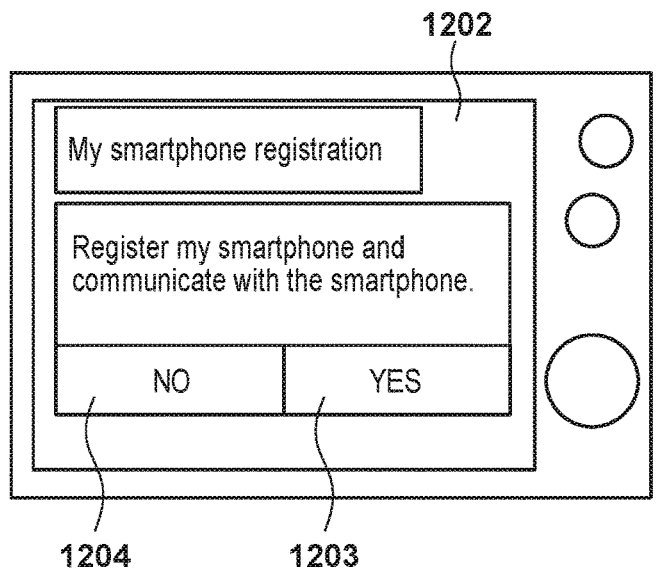

A series of operations for the digital camera 100 to acquire the identification information of the smartphone 200, and perform my smartphone registration will be described with reference to FIGS. 8, 12A and 12B. In the present embodiment, the digital camera 100 prompts the user to select whether to perform my smartphone registration at the time of starting communication processing with the smartphone 200. For example, the method of user selection may involve starting my smartphone registration by pressing a communication button 105e of FIG. 1. Also, as in the example shown in FIG. 12A, the setting screen of my smartphone registration setting 1201 may be displayed on the display unit 106 of the digital camera 100, and the user may be prompted to make a selection. The smartphone 200 displays a my smartphone registration screen 1202 shown in FIG. 12B, in the case where my smartphone registration is started by any given method. The user selects whether to perform my smartphone registration and communicate on my smartphone registration screen 1202. In the case where a YES button 1203 was pressed, the digital camera 100 determines that an instruction to perform my smartphone registration has been received. On the other hand, in the case where a NO button 1204 is pressed, the digital camera 100 determines that an instruction not to perform my smartphone registration has been received. The digital camera 100 starts the my smartphone registration processing shown in FIG. 8 when it is detected that the YES button 1203 or the NO button 1204 was pressed by the user (i.e., when a selection as to whether to perform my smartphone registration is made) on my smartphone registration screen 1202.

In step S801, the digital camera 100 stores the result of the user operation (i.e., pressing of YES button or pressing of NO button) on the my smartphone registration screen 1202 in the work memory 104. In step S802, the digital camera 100 establishes communication with the smartphone 200 via the communication unit 111, by the method described above in the configuration of the system.

In step S803, the digital camera 100 transmits a request for acquisition of identification information of the smartphone to the smartphone 200. At step S804, the digital camera 100 determines whether the identification information of the smartphone has been received from the smartphone 200. Note that the identification information that is received corresponds to the identification information transmitted by the smartphone 200 to the digital camera 100 in step S903 of FIG. 9. The digital camera 100 advances the processing to step S805, if the identification information has been received from the smartphone 200 via the communication unit 111. On the other hand, if the identification information has not been received from the smartphone 200 during a predetermined time period, the digital camera 100 returns the processing to step S804 in order to further wait for reception of the identification information.

In step S805, the digital camera 100 holds the received identification information of the smartphone 200 in the work memory 104. In step S806, the digital camera 100 determines whether my smartphone registration is selected, based on the result of the user operation stored at step S801. If it is determined that my smartphone registration is selected based on the stored result of the user operation, the digital camera 100 advances the processing to step S807. On the other hand, in the case where my smartphone registration is not selected (i.e., NO is selected), the digital camera 100 ends this series of operations, without performing my smartphone registration. In step S807, the digital camera 100 holds the identification information of the smartphone 200 held at step S806 as the identification information of my smartphone, and, thereafter, ends this series of operations.

Note that the identification information held at step S805 is used in collating the identification information of the smartphone that is currently in communication with the registered identification information of my smartphone. In the present embodiment, a plurality of identification information of my smartphone can be held, but a configuration may be adopted in which the registered identification information of my smartphone is replaced, in the case where my smartphone registration is newly performed. The digital camera 100 holds the identification information held at step S805, until communication with the smartphone 200 is disconnected, for example.

Series of Operations Related to Setting of the Smartphone (Acquisition of Camera Identification Information)

Figure 9:
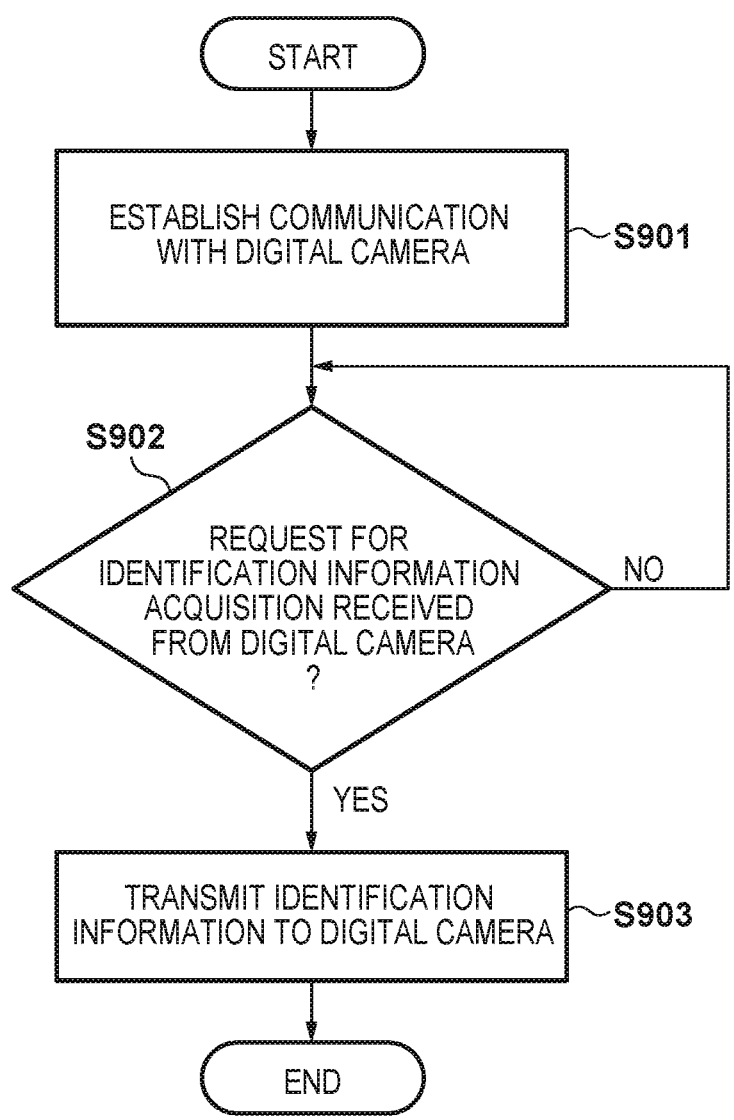
FIG. 9 is a flowchart showing a series of operations related to setting of the smartphone in the second embodiment.

Next, a series of operations that the smartphone 200 performs at the time of the digital camera 100 acquiring the identification information of the smartphone 200 will be described, with reference to FIG. 9.

In step S901, the smartphone 200 establishes communication with the digital camera 100 via the communication unit 211, using the method described above in the configuration of the system. At step S902, the smartphone 200 determines whether a request for acquisition of the identification information of the smartphone 200 has been received from the digital camera 100. If it is determined that a request for identification information acquisition has been received via the communication unit 211, the smartphone 200 advances the processing to step S903. On the other hand, if a request for identification information acquisition has not received via the communication unit 211 during a predetermined time period, the smartphone 200 returns the processing to step S902 again in order to wait for a request for identification information acquisition. In step S903, the smartphone 200 transmits the identification information of the smartphone to the digital camera 100, and, thereafter, ends this series of operations.

Figure 10:
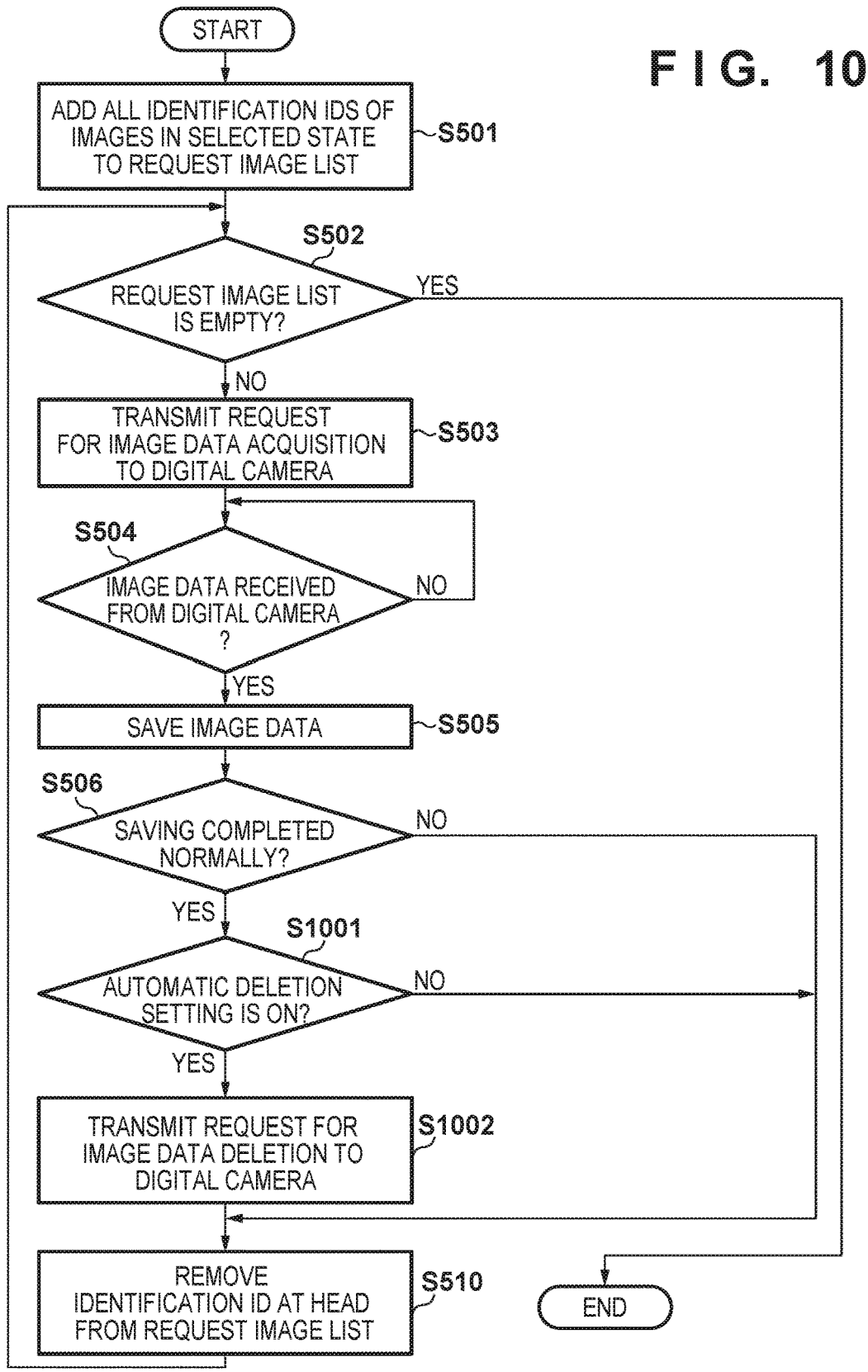
FIG. 10 is a flowchart showing a series of operations related to save processing and delete processing of the smartphone in the second embodiment.

Series of Operations Related to Save Processing and Delete Processing in Smartphone Next, a series of operations in the smartphone 200 at the time of performing save processing and delete processing of image data will be described, with reference to FIG. 10.

First, the smartphone 200 performs the processing of steps S501 to S506 shown in FIG. 5, and acquires image data from the digital camera 100. If, in step S506, it is determined that processing for saving the image data was completed normally, the smartphone 200 advances the processing to S1001. On the other hand, if, in step S506, it is determined that processing for saving the image data was not completed normally, the smartphone 200 advances the processing of step S510 and ends this series of operations.

In S1001, the smartphone 200 determines whether the automatic image deletion setting in the application settings is ON. The smartphone 200 refers to the setting value of the automatic image deletion setting held in the work memory 204 in step S357, for example, and, if the setting value is ON, determines that the automatic image deletion setting is ON and advances the processing to S1002. On the other hand, if the setting value referred to is OFF, the smartphone 200 determines that the automatic image deletion setting is not ON and advances the processing to step S510.

In S1002, the smartphone 200 transmits a request for image data deletion to the digital camera 100, using the identification ID at the head of the request image list again.

Figure 11:
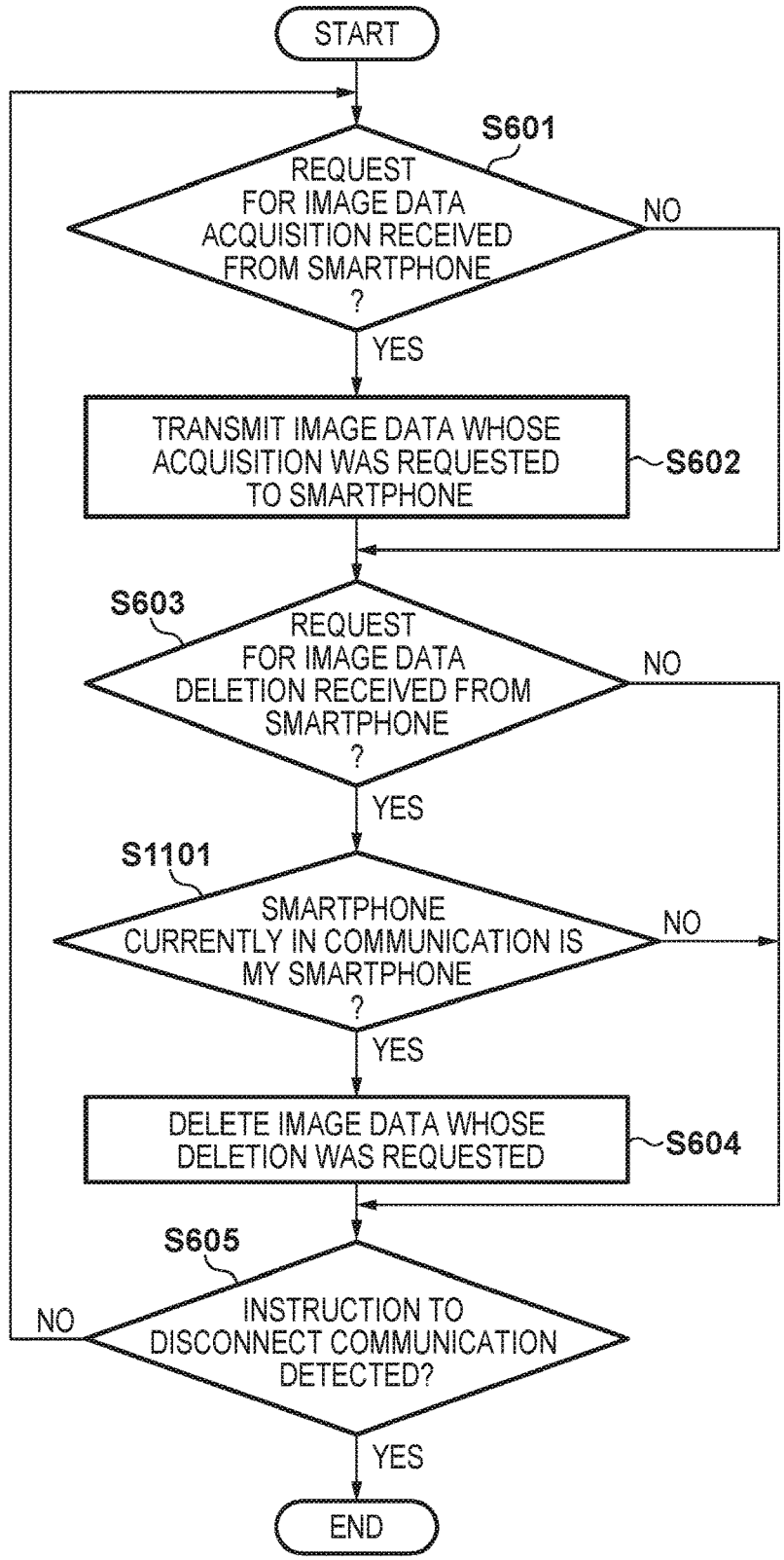
FIG. 11 is a flowchart showing operations related to save processing and delete processing of the digital camera in the second embodiment.

Series of Operations Related to Save Processing and Delete Processing in Digital Camera Next, a series of operations in the digital camera 100 at the time of performing save processing and delete processing of image data will be described, with reference to FIG. 11. Note that the digital camera 100 executes the processing of steps S601 to S603 shown in FIG. 6, determines whether a request for image data deletion has been received, and, if it is determined that a deletion request has been received from the smartphone 200, advances the processing to S1101. On the other hand, if it is determined that a deletion request has not been received from the smartphone 200, the digital camera 100 advance processing to step S605 and ends the series of operations related to this processing.

In S1101, the digital camera 100 determines whether the smartphone 200 that is currently in communication is the smartphone registered as my smartphone. The determination as to whether the smartphone 200 is my smartphone is performed by collating the identification information of the smartphone 200 held in step S805 of FIG. 8 with the identification information on my smartphone held at step S807. If it is determined that the smartphone 200 that is currently in communication is my smartphone, the digital camera 100 advances the processing to step S604. On the other hand, if it is determined that the smartphone 200 that is currently in communication is not my smartphone, the digital camera 100 advances the processing to step S605 and ends this series of operations.

Note that the present embodiment described an example in which the digital camera 100 receives a request for the image data deletion from the smartphone 200 at step S603, and deletes image data if it is determined at S1101 that the smartphone that is currently in communication is my smartphone. However, a configuration may be adopted in which the digital camera 100 automatically deletes the image data after completion of image transmission, rather than the smartphone 200 sending a request for image data deletion. That is, the digital camera 100 receives the setting value (ON/OFF) of the automatic image deletion setting from the smartphone 200, and, after transmitting image data to the smartphone 200 at step S602, may determine whether a condition for deleting the image data is satisfied. The condition for deleting the image data is that the setting value of the automatic image deletion setting of the smartphone 200 is ON, and the smartphone 200 that is currently in communication is registered as my smartphone. There are cases, however, where the processing for saving the image data in the smartphone 200 is not completed normally (e.g., step S506 of FIG. 10), after the digital camera 100 has transmitted the image data to the smartphone 200 at step S602. A configuration may thus be adopted in which the digital camera 100 receives a notification indicating whether the processing for the saving image data ended normally from the smartphone 200, before deleting the image data. This enables the digital camera 100 to delete image data, only in the case where the save processing in the smartphone 200 is completed normally.

Also, although the present embodiment described an example in which the automatic image deletion setting is performed in the smartphone 200, a configuration may be adopted in which the automatic image deletion setting is performed in the digital camera 100. That is, the digital camera 100 may be configured to determine the held setting value of the automatic image deletion, after transmitting image data to the smartphone 200. In this case, the digital camera 100 deletes the transmitted image data, only in the case where the setting value is ON and the smartphone communicating with the digital camera 100 is my smartphone.

In the present embodiment, as described above, the identification information of the smartphone 200 is registered in the digital camera 100, and the digital camera 100 determined whether the identification information of the smartphone communicating with the digital camera 100 matches the registered identification information. In the case where the identification information matches, the digital camera 100 deletes the image data after the image data has been transmitted. This makes it possible to prevent image data recorded in the digital camera 100 from being unintentionally deleted, in the case where image data recorded in the digital camera 100 is deleted following image data from the digital camera 100 being saved.

Figure 12C:
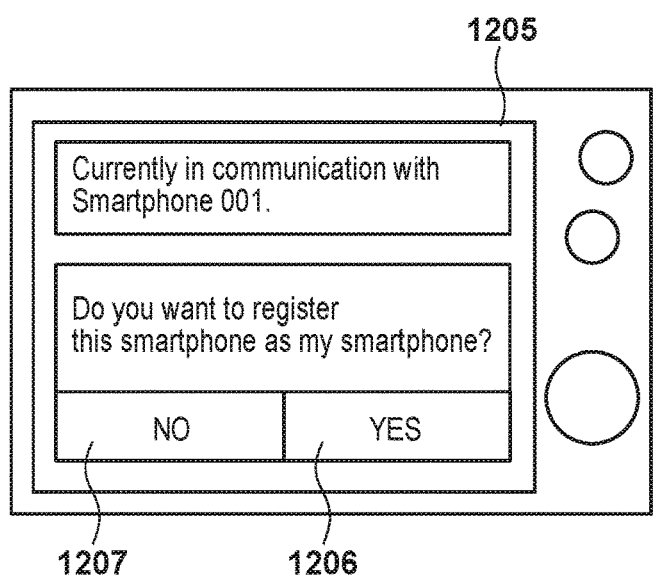

Note that although the present embodiment described an example in which the digital camera 100 prompts the user to select whether to perform my smartphone registration, at the time of starting communication processing with the smartphone 200, the present invention is not limited thereto. A configuration may be adopted in which the digital camera 100 displays a my smartphone registration dialog 1205, one example of which is shown in FIG. 12C, on the display unit 106, after establishing communication with the smartphone 200. The digital camera 100 may be configured to register the smartphone 200 that is currently in communication as my smartphone in the case where a YES button 1206 is selected, and to not perform my smartphone registration in the case where a NO button 1207 is selected.

Furthermore, although the present embodiment described an example in which identification information acquired from the smartphone 200 and registered is collated with the identification information of the smartphone that is currently in communication, as the smartphone determination method that is performed in the digital camera 100, the present invention is not limited thereto. For example, a configuration may be adopted in which the identification information is acquired from a server (e.g., Web server) holding the identification information of my smartphone, rather than being acquired from the smartphone 200. Also, a configuration may be adopted in which the smartphone 200 is identified as my smartphone and processing is performed, only in the case where communication is performed between the smartphone 200 and the digital camera 100 using proximity wireless communication, for example, rather than performing determination using the identification information of the smartphone. Also, a configuration may be adopted in which the smartphone 200 is identified as my smartphone and processing is performed, only in the case where the digital camera 100 and the smartphone 200 are paired using Bluetooth (registered trademark). Furthermore, a configuration may be adopted in which the number of times that communication is established with the digital camera 100 is recorded, and the smartphone 200 that has established communication a prescribed number of times or more is identified as my smartphone.

Also, although the abovementioned embodiments described examples in which image data recorded in the digital camera 100 is saved to an external apparatus and deleted, the data may be data other than image data, such as data representing sound, text or the behavior history of the user, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091652, filed Apr. 28, 2016, which is hereby incorporated by reference herein in its entirety.

What is claimed is:

1. A communication apparatus comprising
a memory that stores a program; and
at least one processor that executes the program to cause the communication apparatus to function as:
   a communication unit configured to communicate with a recording apparatus having storage medium and capable of accepting an operation on the content data stored in the storage medium via communication;
   a registration unit configured to register a predetermined recording apparatus; and
   a control unit configured to perform control for receiving the content data stored in the storage medium, and to control predetermined processing for causing the recording apparatus to delete the content data stored in the storage medium,
   wherein the control unit, in a case where the recording apparatus is the predetermined recording apparatus registered by the registration unit, performs control so as to perform the predetermined processing for causing the content data stored in the storage medium to be deleted, and in a case where the recording apparatus is not the predetermined recording apparatus registered by the registration unit, performs control so as to not perform the predetermined processing for causing the content data stored in the storage medium to be deleted.

2. The apparatus according to claim 1, wherein the registration unit registers the predetermined recording apparatus, before a connection is established with the recording apparatus via the communication unit.

3. The apparatus according to claim 1, wherein the registration unit registers the predetermined recording apparatus, after a connection is established with the recording apparatus via the communication unit.

4. The apparatus according to claim 1, further comprising a setting unit configured to, in a case where the content data stored in the storage medium is received via the communication unit, set whether to delete the content data stored in the storage medium,
   wherein the control unit, in a case where the recording apparatus is the predetermined recording apparatus registered by the registration unit, and the content data stored in the storage medium is set by the setting unit to be deleted, performs control so as to perform the predetermined processing for causing the content data stored in the storage medium to be deleted.

5. The apparatus according to claim 4, wherein the setting unit is set as to whether to delete the content data stored in the storage medium, before a connection is established with the recording apparatus via the communication unit.

6. The apparatus according to claim 4, wherein the setting unit is set as to whether to delete the content data stored in the storage medium, according to an operation for saving the content data, after a connection is established with the recording apparatus via the communication unit.

7. The apparatus according to claim 4, wherein in a case where the recording apparatus is not the predetermined recording apparatus registered by the registration unit, or in a case where the predetermined recording apparatus is not registered by the registration unit, the setting unit is configured to not accept setting.

8. The apparatus according to claim 1, further comprising a display unit configured to, in a case where the recording apparatus is the predetermined recording apparatus registered by the registration unit, display that the recording apparatus is the predetermined recording apparatus.

9. The apparatus according to claim 1, wherein the registration unit registers the predetermined recording apparatus using identification information that uniquely identifies the predetermined recording apparatus, and
   wherein the identification information is received via the communication unit.

10. A control method of a communication apparatus that has a communication unit configured to communicate with a recording apparatus having storage medium and capable of accepting an operation on the content data stored in the storage medium via communication, the method comprising:
   registering a predetermined recording apparatus; and
   performing control for receiving the content data stored in the storage medium, and controlling predetermined processing for causing the recording apparatus to delete the content data stored in the storage medium,
   wherein, in a case where the recording apparatus is the registered predetermined recording apparatus, control is performed so as to perform the predetermined processing for causing the content data stored in the storage medium to be deleted, and in a case where the recording apparatus is not the predetermined recording apparatus registered in the registering, control is performed so as to not perform the predetermined processing for causing the content data stored in the storage medium to be deleted.

11. A communication system comprising a recording apparatus and a communication apparatus,
the recording apparatus including
a storage medium;
a memory that stores a program; and
at least one processor that executes the program to cause the recording apparatus to function as:
a first communication unit configured to accept, from the communication apparatus, an operation on the content data and to transmit the content data to the communication apparatus;
a registration unit configured to register a predetermined communication apparatus; and
a deletion unit configured to delete the content data stored in the storage medium, based on the operation, and
the communication apparatus including
a memory that stores a program; and
at least one processor that executes the program to cause the communication apparatus to function as:
a second communication unit configured to communicate with the recording apparatus;
a control unit configured to perform control for receiving the content data stored in the storage medium, and to perform predetermined control for causing the recording apparatus to delete the content data stored in the storage medium;
wherein the deletion unit of the recording apparatus, in a case where the communication apparatus is the predetermined communication apparatus registered by the registration unit, deletes the content data, according to the predetermined control, by the communication apparatus, for causing the content data stored in the storage medium to be deleted, and in a case where the communication apparatus is not the predetermined communication apparatus registered by the registration unit, does not delete the content data according to the predetermined control, by the communication apparatus, for causing the content data stored in the storage medium to be deleted.

12. The system according to claim 11, wherein the registration unit registers the predetermined communication apparatus, before a connection is established with the communication apparatus.

13. The system according to claim 11, wherein the registration unit registers the predetermined communication apparatus, after a connection is established with the communication apparatus.

14. A non-transitory computer-readable storage medium storing a program for causing a computer to execute a control method of a communication apparatus that has a communication unit configured to communicate with a recording apparatus having storage medium and capable of accepting an operation on the content data via communication, the method comprising:
registering a predetermined recording apparatus; and
performing control for receiving the content data stored in the storage medium, and controlling predetermined processing for causing the recording apparatus to delete the content data stored in the storage medium,
wherein, in a case where the recording apparatus is the registered predetermined recording apparatus, control is performed so as to perform the predetermined processing for causing the content data stored in the storage medium to be deleted, and in a case where the recording apparatus is not the predetermined recording apparatus registered in the registering, control is performed so as to not perform the predetermined processing for causing the content data stored in the storage medium to be deleted.

* * * * *